United States Patent
Kanazawa

(10) Patent No.: US 8,979,274 B2
(45) Date of Patent: Mar. 17, 2015

(54) DISPLAY DEVICE

(75) Inventor: Takakiyo Kanazawa, Kanagawa (JP)

(73) Assignee: Sony Corporation, Tokyo (JP)

(*) Notice: Subject to any disclaimer, the term of this patent is extended or adjusted under 35 U.S.C. 154(b) by 378 days.

(21) Appl. No.: 13/231,450

(22) Filed: Sep. 13, 2011

(65) Prior Publication Data

US 2012/0069304 A1 Mar. 22, 2012

(30) Foreign Application Priority Data

Sep. 21, 2010 (JP) .................................. 2010-211227

(51) Int. Cl.
| | |
|---|---|
| *G03B 21/14* | (2006.01) |
| *G03B 21/28* | (2006.01) |
| *G03B 21/00* | (2006.01) |
| *H04N 9/31* | (2006.01) |

(52) U.S. Cl.
CPC .............. *G03B 21/28* (2013.01); *G03B 21/006* (2013.01); *H04N 9/3147* (2013.01)
USPC ..................... 353/34; 353/20; 353/71; 353/82

(58) Field of Classification Search
CPC ........ G03B 21/10; G03B 21/14; G03B 21/26; G03B 21/28; G03B 21/58; H04N 5/74; H04N 5/7408; H04N 5/7416
USPC ............ 353/20, 34, 37, 71, 82, 122; 348/744, 348/750, E9.025, E5.137
See application file for complete search history.

(56) References Cited

U.S. PATENT DOCUMENTS

| | | | |
|---|---|---|---|
| 2005/0128730 A1* | 6/2005 | Shindoh ........................... | 362/19 |
| 2008/0180581 A1* | 7/2008 | Slobodin et al. ............... | 348/744 |
| 2010/0060618 A1 | 3/2010 | Okuda et al. | |
| 2010/0060809 A1 | 3/2010 | Okuda et al. | |
| 2010/0103332 A1* | 4/2010 | Li et al. ......................... | 348/750 |

FOREIGN PATENT DOCUMENTS

| | | |
|---|---|---|
| JP | 06-181558 | 6/1994 |
| JP | 2003-029334 | 1/2003 |
| JP | 2004-126465 | 4/2004 |
| JP | 2004-341429 | 12/2004 |
| JP | 2005-051600 | 2/2005 |

(Continued)

OTHER PUBLICATIONS

Japanese Office Action issued in connection with related Japanese counterpart application No. 2010-211227 dated Mar. 4, 2014.

*Primary Examiner* — Kevin Pyo
(74) *Attorney, Agent, or Firm* — Dentons US LLP

(57) ABSTRACT

A display device includes: a light source section; an optical modulator modulating light from the light source section based on a picture signal, to emit modulated light as picture light; a direct-view display section performing direct-view display based on the picture light; a projection optical system performing projection display on a projection screen based on the picture light; an optical member allowing the picture light from the optical modulator to travel toward at least one of the direct-view display section and the projection optical system; and a switching section performing control of traveling direction of the picture light on the optical member, to switch between two or more display modes which are selected, to include a two-way display mode, from a group consisting of a direct-view display mode, a projection display mode, and the two-way display mode.

16 Claims, 16 Drawing Sheets

(56) References Cited

FOREIGN PATENT DOCUMENTS

| | | |
|---|---|---|
| JP | 2006-119533 | 5/2006 |
| JP | 2008-065137 | 3/2008 |
| JP | 2008-233599 | 10/2008 |
| JP | 2009-003428 | 1/2009 |
| JP | 2009-135622 | 6/2009 |
| JP | 2009-237383 | 10/2009 |

* cited by examiner

DIRECT-VIEW DISPLAY MODE

DIRECT-VIEW DISPLAY MODE

DISPLAY DEVICE

BACKGROUND

The present disclosure relates to a display device having functions of direct-view display and projection display.

In portable devices such as video cameras, digital camera, and portable cellular phones, image monitors (direct-view display sections) using liquid crystal panels, for example, have been virtually indispensable components. Since the display sections to be provided to portable devices are desirably small in size, other display devices including a larger liquid crystal monitor and a projector (projection display device) are frequently used when a captured image is to be seen on a large screen, for example.

As the projectors, ones having a small size and excellent in portability have been commercialized so that we can use them outdoors or away from home. With current advancement in reduction of the size of projectors, digital cameras containing projectors have been also commercialized. In the digital cameras with built-in projectors, liquid crystal panels and small projectors, for example, are used for image monitoring (direct-view display) and projection display, respectively. That is, two different display devices are equipped for direct-view display and projection display, respectively.

Lately, in order to further reduce the size of an entire display device, a display device in which a part of optical systems of the two display devices are shared by the two display devices is being proposed (see, for example, Japanese Unexamined Patent Application Publication No. 2008-233599, and Japanese Unexamined Patent Application Publication No. 2009-003428).

SUMMARY

The display device disclosed in Japanese Unexamined Patent Application Publication No. 2008-233599, is capable of simultaneously performing direct-view display and projection display. However, the display device is unable to switch a display mode between, for example, the direct-view display and the projection display, and thus is insufficient from the viewpoint of convenience of users.

In contrast, the display device disclosed in Japanese Unexamined Patent Application Publication No. 2009-003428, is capable of switching a display mode between the direct-view display and the projection display. However, for users, it is desirable that switching of a display mode between various types of display modes be realized, and thus the display device is still insufficient from the viewpoint of convenience of users.

It is desirable to provide a display device which increases convenience of users.

A display device according to an embodiment of the present disclosure includes: a light source section; an optical modulator modulating light from the light source section based on a picture signal, to emit modulated light as picture light; a direct-view display section performing direct-view display based on the picture light; a projection optical system performing projection display on a projection screen based on the picture light; an optical member allowing the picture light from the optical modulator to travel toward at least one of the direct-view display section and the projection optical system; and a switching section performing control of traveling direction of the picture light on the optical member, to switch between two or more display modes which are selected, to include a two-way display mode, from a group consisting of a direct-view display mode, a projection display mode, and the two-way display mode, the direct-view display mode allowing the picture light to selectively travel toward the direct-view display section, the projection display mode allowing the picture light to selectively travel toward the projection optical system, and the two-way display mode allowing the picture light to travel toward both of the direct-view display section and the projection optical system.

In the display device according to the embodiment of the present disclosure, the light from the light source section is modulated based on the picture signal by the optical modulator and is emitted as the picture light. Further, the picture light from the optical modulator is allowed, by the optical member, to travel toward at least one of the direct-view display section and the projection display section. At this time, the control of the traveling direction of the picture light is performed on the optical member, to switch between two or more display modes which are selected, to include the two-way display mode, from the group consisting of the direct-view display mode, the projection display mode, and the two-way display mode.

In the display device according to the embodiment of the present disclosure, the switching section is provided which performs the control of the traveling direction of the picture light on the optical member, to switch between two or more display modes which are selected, to include the two-way display mode, from the group consisting of the direct-view display mode, the projection display mode, and the two-way display mode. This makes it possible to switch a display mode between various types of display modes, thereby increasing convenience of users.

It is to be understood that both the foregoing general description and the following detailed description are exemplary and are intended to provide further explanations of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, an embodiment of the present disclosure will be described in detail with reference to the drawings. The descriptions will be made in the following sequence:
1. Embodiment (a first example in which a display mode is switched using a beam splitter)
2. Modifications
   First Modification (a second example in which a display mode is switched using a beam splitter)
   Second Modification (an example in which a display mode is switched using a polarization beam splitter)
   Third Modification (an example in which light sources for other colors are provided instead of a white light source in Embodiment)
   Fourth Modification (an example in which light sources for other colors are provided instead of a white light source in the first modification)
   Fifth Modification (an example in which light sources for other color are provided instead of a white light source in the second modification)
   Sixth Modification (an example in which part of an optical path is bent using a pair of mirrors)
[Embodiment]
[External Configuration of Display Device 1]

Figure 1:
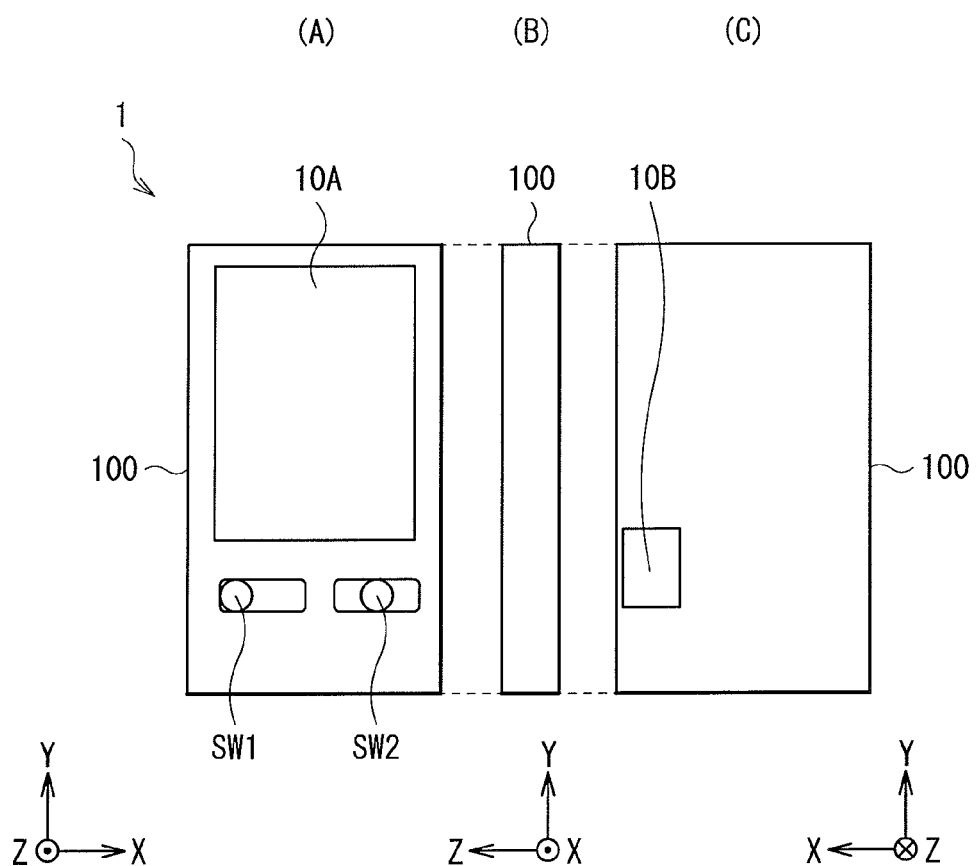
FIG. 1 is a schematic view illustrating an example of the external configuration of a display device according to an embodiment of the present disclosure.

FIG. 1 is a schematic view illustrating the external configuration of a display device (display device 1) according to an embodiment of the present disclosure. (A), (B), and (C) of FIG. 1 illustrate a plane configuration (X-Y plane configuration) viewed from the front side, a side configuration (Y-Z plane configuration), and a plane configuration (X-Y plane configuration) viewed from the back side, respectively. The display device 1 is capable of switching a display mode between at least two types of display modes, as described below.

In the display device 1, a direct-view display section 10A (monitor section), a light emission section 10B for projection (light emission port for projection), a display mode selector switch SW1, and a focus adjustment switch SW2 are provided on a rectangular case 100. More specifically, the direct-view display section 10A, the display mode selector switch SW1, and the focus adjustment switch SW2 are provided on the front surface of the case 100, as shown in (A) of FIG. 1, while the light emission section 10B for projection is provided on the back surface of the case 100, as shown in (B) of FIG. 1.

The direct-view display section 10A performs direct-view display based on picture light described below and includes a screen for rear projection, for example. The screen is coated with a dispersing agent, for example, at its surface, so that incident light is transmitted through the screen while being diffused.

The light emission section 10B for projection is a light emission port used when projection display is performed based on the picture light described below. Through the light emission section 10B for projection, the picture light is projected (magnified and projected) onto an external screen (projection target plane) not shown.

The display mode selector switch SW1 is for switching a display mode between at least two types of display modes described below. More specifically, switching a display mode is enabled in such a manner that a user operates the display mode selector switch SW1. It is to be noted that the display mode selector switch SW1 corresponds to an example of a "switching section" in the present disclosure.

The focus adjustment switch SW2 is for optionally adjusting the focus of projection display in a display mode for projection display. More specifically, performing the focus adjustment freely is enabled in such a manner that a user operates the focus adjustment switch SW2.
[Entire Configuration of Display Device 1]

Figure 2:
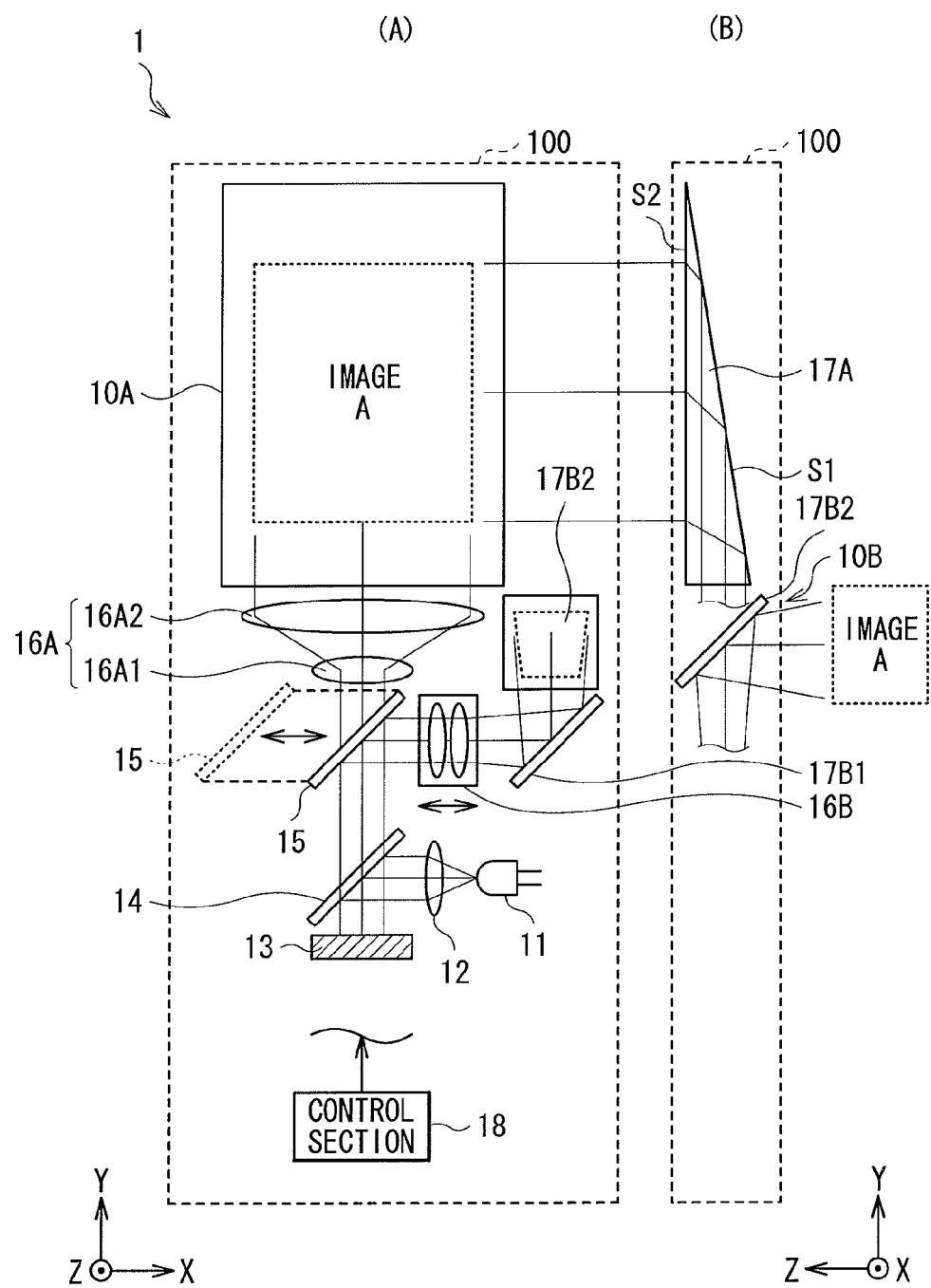
FIG. 2 is a schematic view illustrating an example of the entire configuration of the display device according to the embodiment.

FIG. 2 is a schematic view illustrating the entire configuration of the display device 1. (A) and (B) of FIG. 2 illustrate a plane configuration (X-Y plane configuration) viewed from the front side and a side configuration (Y-Z plane configuration), respectively. It is to be noted that (B) of FIG. 2 only shows a part of the configuration for easier illustration.
[Common Optical Systems]

The display device 1 includes, as optical systems common to display modes described below, a light source 11, a collimator lens 12, a reflection liquid crystal device 13, a polarization beam splitter 14, and a beam splitter 15.

The light source 11 is a light source (light source section made of one type of light source) which emits a white light containing red, green, and blue lights (lights of the color components). As the light source 11, a white LED (Light Emitting Diode), for example, may be used. When a white LED is used as the light source 11, light emitted from the light source 11 is polarized in random directions, that is, the emitted light is an unpolarized light.

The collimator lens 12 is for collimating light from the light source 11 (making the light parallel light) and emitting the light.

The reflection liquid crystal device 13 is an optical modulator which emits picture light by reflecting the light (parallel light) incident from the collimator lens 12 while modulating the light based on a picture signal supplied from a control section 18. At this time, a reflection liquid crystal device 21 performs reflection so that the respective polarized lights when being input and output are different from each other (for example, s-polarized light and p-polarized light). The reflection liquid crystal device 21 includes a liquid crystal device such as a LCOS (Liquid Crystal On Silicon). Further, in color picture display, the reflection liquid crystal device 21 is provided with a color filter such as a red color filter, a green color filter, or a blue color filter.

The polarization beam splitter 14 is an optical member which selectively allows a specific polarized light (for example, p-polarized light) to transmit as well as selectively allows another polarized light (for example, s-polarized light) to reflect. With the operation of the polarization beam splitter 14, a specific polarized light (for example, s-polarized light) of the light incident from the collimator lens 12 is selectively reflected to enter the reflection liquid crystal device 13, while the picture light emitted from the reflection liquid crystal device 13 (for example, p-polarized light) is selectively transmitted.

The beam splitter 15 is an optical member which emits the picture light, having entered the beam splitter 15 via the polarization beam splitter 14 after being modulated by the reflection liquid crystal device 13, to at least one of the direct-view display section 10A and a projection lens 16B described below (allows the picture light to travel toward the direct-view display section 10A, the projection lens 16B, or both thereof described below). More specifically, the beam splitter 15 is capable of controlling the direction of the emission (selecting the direction of travelling), using partial transmission and partial reflection of the incident picture light (dispersion of the picture light). The dispersion ratio at this time is set according to the amount of light (luminance) necessary for, for example, the direct-view display and the projection display described below.

In the beam splitter 15 of the present embodiment, the angles of the light incidence plane and the light exit (reflection) plane are adjusted so that the planes are located oblique with respect to the path (travelling direction) of the picture light, as shown in (A) of FIG. 2. Further, the beam splitter 15 is configured to move into and out of the path of the picture light, i.e., the beam splitter 15 is disposed in and removed from the path of the picture light (hereinafter referred to as the entering and exiting motions) in accordance with control by the control section 18 in response to the operation to the display mode selector switch SW1, as indicated by the arrow in (A) of FIG. 2. The control of the entering and exiting motions of the beam splitter 15 will be described in detail later. It is to be noted that the beam splitter 15 corresponds to an example of an "optical member" in the present disclosure.

[Optical Systems Used for Direct-View Display]

The display device 1 includes an expander lens 16A and a prism 17A, as optical systems used for performing the direct-view display described below (in the direct-view display mode and the two-way display mode described below).

The expander lens 16A, which may have two lenses 16A1 and 16A2 in this embodiment, is arranged on the optical path between the beam splitter 15 and the direct-view display section 10A. The expander lens 16A serves to increase (i.e., expand) the beam diameter of incident picture light in one (horizontal direction, that is, X-axis direction in this case) of the horizontal direction (X-axis direction) and the vertical direction (Y-axis direction) of the direct-view display section 10A and emit the picture light, as shown in (A) of FIG. 2. In this way, the picture light of which beam diameter has been selectively increased in the X-axis direction enters the prism 17A. It is to be noted that the expander lens 16A corresponds to an example of a "first beam expander" in the present disclosure.

The prism 17A is arranged on the optical path between the beam splitter 15 and the direct-view display section 10A (more specifically, between the expander lens 16A and the direct-view display section 10A), as shown in (B) of FIG. 2. The prism 17A includes an incidence plane which the light emitted from the expander lens 16A enters, a reflection plane S1 from which the incident light is reflected, and a diffusion/transmission plane S2 for diffusing and transmitting the reflected light to be emitted to the direct-view display section 10. In the prism 17A, the reflection plane S1 is arranged obliquely to the path of the incident light (so that an incident angle is formed). This allows the prism 17A to increase (i.e., to expand) the beam diameter of incident picture light in the other (vertical direction, that is, Y-axis direction in this case) of the horizontal direction (X-axis direction) and the vertical direction (Y-axis direction) of the direct-view display section 10A and to emit the picture light. In other words, the picture light, of which beam diameter has been increased in the X-axis direction by the expander lens 16A, is further increased in the beam diameter in the Y-axis direction, to enter the direct-view display section 10A. It is to be noted that the prism 17A corresponds to an example of a "second beam expander" in the present disclosure.

[Optical Systems Used for Projection Display]

The display device 1 further includes a projection lens 16B (projection optical system) and mirrors 17B1 and 17B2, as optical systems used for performing the projection display described below (in the two-way display mode described below).

The projection lens 16B is for projecting (magnifying and projecting), onto an external screen (projection target plane) not shown, the light (picture light) modulated by the reflection liquid crystal device 21 and reflected by the beam splitter 15. This enables projection display onto the external screen based on the picture light. The projection lens 16B is movable in the optical axis direction in accordance with control by the control section 18 in response to the operation to the focus adjustment switch SW2, as indicated by the arrow in (A) of FIG. 2. Thus, the focus of displayed content (displayed image) is adjusted in the projection display described below.

The mirrors 17B1 and 17B2 are arranged on the optical path between the projection lens 16B and the light emission section 10B for projection, as shown in (A) and (B) of FIG. 2. The mirrors 17B1 and 17B2 are for reflecting the picture light projected (magnified and projected) by the projection lens 16B, to be emitted from the light emission section 10B for projection to the outside.

[Control Section 18]

The display device 1 further includes the control section 18, as shown in (A) of FIG. 2. The control section 18 has a function of supplying a picture signal to the reflection liquid crystal device 13 (performing display control), as described above. Further, the control section 18 has a function of performing control so that the projection lens 16B is moved (displaced) in the optical axis direction thereof in response to the operation to the focus adjustment switch SW2, as described above. Moreover, the control section 18 has a function of performing control on the entering and exiting motions of the beam splitter 15 for the path of the picture light in response to the operation to the display mode selector switch SW1. By allowing the control section 18 to perform control on the entering and exiting motions of the beam splitter 15, the direction of emission (the traveling direction) of the picture light is controlled, thereby enabling switch of a display mode between at least two types of display modes. The control section 18 may be adapted to perform control on other optical members, such as control of amount of light emission from the light source 11.

[Operations and Advantages of Display Device 1]

[1. Basic Display Operation]

In the display device 1, light emitted from the light source 11 is collimated by the collimator lens 12 to become parallel light. The parallel light is selectively reflected by the polarization beam splitter 14 to enter the reflection liquid crystal device 13. In the reflection liquid crystal device 13, the light having entered the reflection liquid crystal device 13 is reflected while being modulated based on a picture signal, so as to be emitted as picture light. The picture light emitted from the reflection liquid crystal device 13 is selectively transmitted through the polarization beam splitter 14 since the respective polarized lights when being input and output are different from each other.

Next, the picture light having transmitted through the polarization beam splitter 14 is emitted to at least one of the direct-view display section 10A and the projection lens 16B via the beam splitter 15. More specifically, after being selectively increased in the beam diameter in the horizontal direction (X-axis direction) of the direct-view display section 10A by the expander lens 16A, the picture light emitted to the direct-view display section 10A enters the prism 17A. Moreover, the picture light, of which beam diameter has been increased in the X-axis direction, is further increased in the beam diameter in the Y-axis direction and then enters the direct-view display section 10A. In this way, magnified projection of images is performed onto the direct-view display section 10A while the size (horizontal to vertical ratio of the beam diameter) of the picture light emitted from the reflection liquid crystal display device 13 is being maintained, so that direct-view display is performed based on a picture signal (see "Image A" shown in (A) of FIG. 2).

On the other hand, the picture light emitted to the projection lens 16B via the beam splitter 15 is projected (magnified and projected) onto the external screen by the projection lens 16B. More specifically, after being reflected by the mirrors 17B1 and 17B2, the picture light projected by the projection lens 16B is emitted from the light emission section 10B for projection to the external screen. Thus, projection display is performed based on a picture signal (see "Image A" shown in (B) of FIG. 2).

[2. Display Mode Switching Operation]

Next, a display mode switching operation, which is one feature of the present disclosure, will be described. In the display device 1 according to Embodiment of the present disclosure, the control section 18 performs control of the direction of emission of picture light with respect to the beam splitter 15 so that a display mode is switch between at least two types of display modes, including the two-way display mode, of the direct-view display mode, projection display mode, and two-way display mode. More specifically, the control section 18 in Embodiment of the present disclosure controls the entering and exiting motions of the beam splitter 15 so that a display mode is switched between the direct-view display mode and the two-way display mode. This makes it possible to perform switching between a larger number of types of display modes than in existing devices. Hereinafter, detailed description will be made of the display mode switching operation of the control section 18.

The direct-visual display mode is a display mode in which picture light is selectively emitted to the direct-view display section 10A (a display mode in which only the direct-view display is performed). The projection display mode is a display mode in which picture light is selectively emitted to the projection lens 16B (a display mode in which only the projection display is performed). The two-way display mode is a display mode in which picture light is emitted to both of the direct-view display section 10A and the projection lens 16B (a display mode in which both of the direct-view display and the projection display are performed). It is to be noted that the respective definitions of these display modes are applicable to the modifications described below.

[Direct-View Display Mode]

Figure 3:
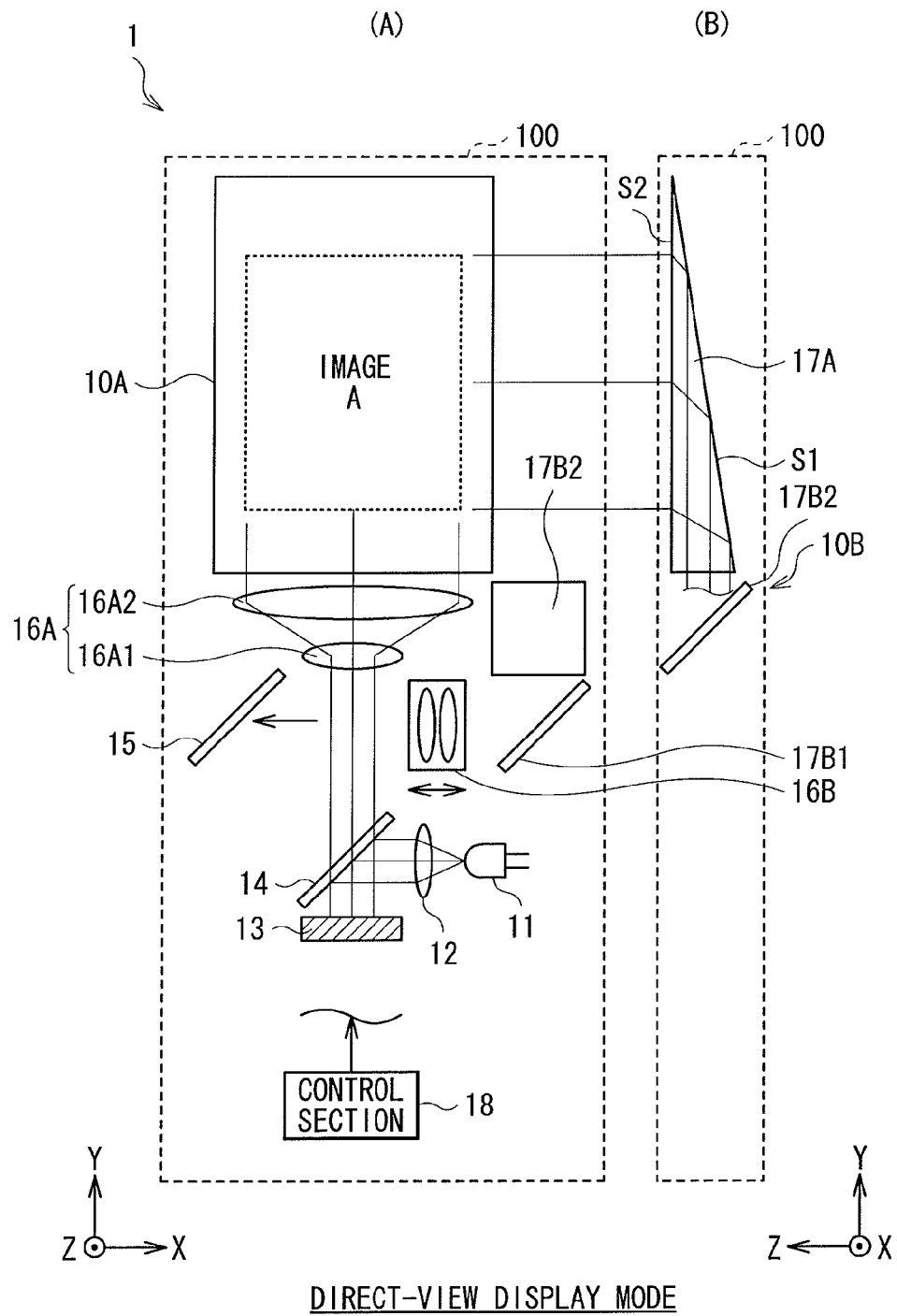
FIG. 3 is a schematic view illustrating an example of the operation of the display device shown in FIG. 2 in the direct-view display mode.

First, the direct-view display mode shown in (A) and (B) of FIG. 3 will be described. In the direct-view display mode, the control section 18 controls the entering and exiting motions of the beam splitter 15 so that the beam splitter 15 is off the path of the picture light (is located outside the path of the picture light), as shown in (A) of FIG. 3. In this way, the picture light emitted from the polarization beam splitter 14 is selectively emitted to the direct-view display section 10A, and only the direct-view display is performed in the direct-view display section 10A (see "Image A" in the drawing), as shown in (A) of FIG. 3. This is a switching of a display mode to the direct-view display mode.

[Two-Way Display Mode (Identical Image Display)]

Figure 4:
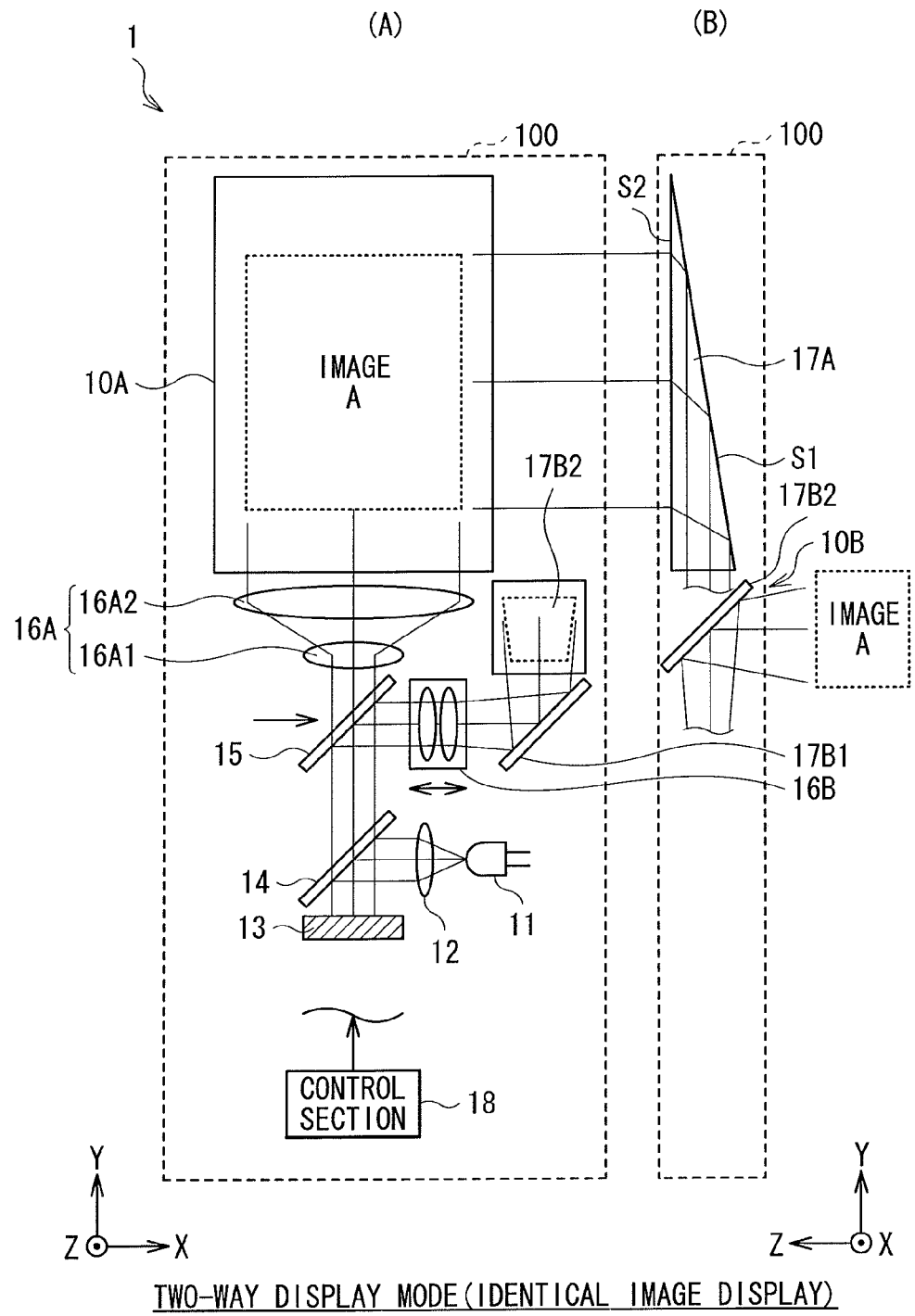
FIG. 4 is a schematic view illustrating an example of the operation of the display device shown in FIG. 2 in the two-way display mode (identical image display).

Next, the two-way display mode shown in (A) and (B) of FIG. 4 will be described. In the two-way display mode, the control section 18 controls the entering and exiting motions of the beam splitter 15 so that the beam splitter 15 is located within the path of the picture light, as shown in (A) of FIG. 4. In this way, the picture light emitted from the polarization beam splitter 14 is emitted to both of the direct-view display section 10A and the projection lens 16B, as shown in (A) and (B) of FIG. 4. As a result, direct-view display is performed in the direct-view display section 10A and projection display using the projection lens 16B is performed (see "Image A" in the drawing). This is a switching of a display mode to the two-way display mode. In the two-way display mode of Embodiment, an identical image (Image A) is displayed in the direct-view display and the projection display, as shown in the drawing. This type of two-way display mode is referred to as a first two-way display mode.

As described above, in Embodiment of the present disclosure, the control section 18 performs control on the direction of emission of the picture light with respect to the beam splitter 15 so that a display mode is switched between at least two types of display modes, including the two-way display mode, of the direct-view display mode, the projection display mode, and the two-way display mode. In other words, the control section 18 performs the control of the traveling direction of the picture light on the beam splitter 15, to switch between two or more display modes which are selected, to include the two-way display mode, from a group consisting of the direct-view display mode, the projection display mode and the two-way display mode. More specifically, the control section 18 controls the entering and exiting motions of the beam splitter 15 (controls the beam splitter 15 to be disposed in and removed from the path of the picture light) so that a display mode is switched between the direct-view display mode and the two-way display mode. This makes it possible to perform switching between various types of display modes, thereby increasing users' convenience.

Further, since the optical systems used for the direct-view display and the optical systems used for the projection display are the same in part, it is possible to reduce the size of the entire display device as well as to lower the cost. As a result, it becomes easy to add a projection function (projection display function) to a display device (electronic unit) only having the direct-view display section 10A, or to add a direct-view display function to a display device (electronic unit) only having a projection display function, for example.

Furthermore, since picture light is emitted to or allowed to travel toward the direct-view display section 10A after the beam diameter of the picture light is selectively increased in the X-axis direction by the expander lens 16A and thereafter is further increased in the Y-axis direction by the prism 17A, it is possible to reduce the thickness of the display device 1. If the beam diameter of the picture light is increased in the X-axis and Y-axis directions at the same time, the thickness of the magnifying optical systems may become large. In order to address this issue, the beam diameter of the picture light is increased in stages in different directions by the expander lens 16A and the prism 17A in Embodiment of the present disclosure, so that reduction in the thickness of the magnifying optical systems is achieved, thereby reducing the thickness of the display device 1.

[Modification Example]

Subsequently, modification examples (the first modification to the sixth modification) of the above embodiment will be described. It is to be noted that the elements of substantially the same functions as those in Embodiment are denoted with the same reference characters as those in Embodiment for adequate omission of descriptions.

[First Modification]

Figure 5:
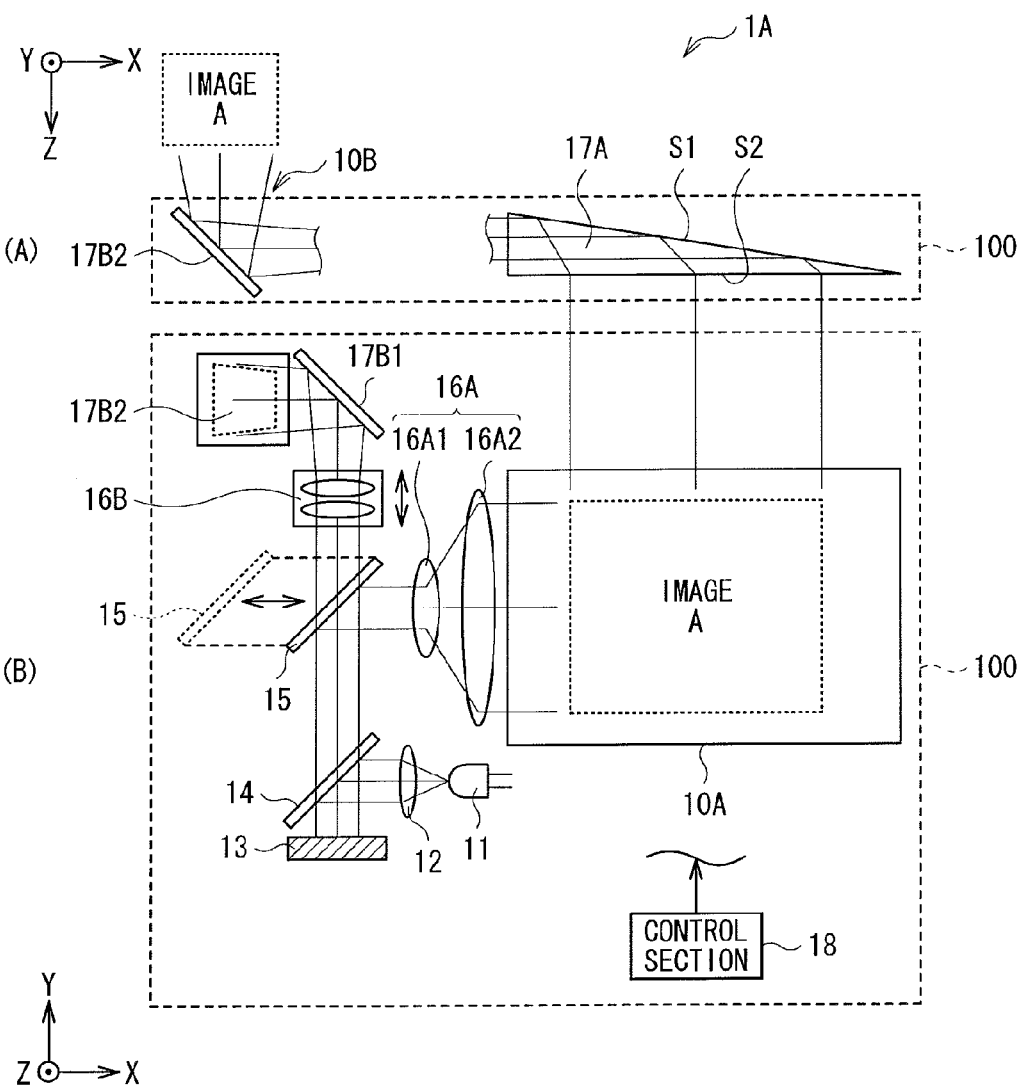
FIG. 5 is a schematic view illustrating an example of the entire configuration of a display device according to a first modification.

FIG. 5 is a schematic view illustrating the entire configuration of the display device (display device 1A) according to the first modification. (A) and (B) of FIG. 5 illustrate the side configuration (Z-X plane configuration) and the plane configuration (X-Y plane configuration) viewed from the front side, respectively. It is to be noted that (A) of FIG. 5 only shows a part of the configuration for easier illustration.

The display device 1A of the first modification includes the same optical members and control section 18 as those of the display device 1 of Embodiment. However, the optical systems for the direct-view display (expander lens 16A, prism 17A, and direct-view display section 10A) and the optical systems for the projection display (projection lens 16B, mirrors 17B1, and 17B2) in the display device 1A are arranged at opposite positions to those in the display device 1 with respect to the emission direction of the picture light from the beam splitter 15. Therefore, unlike in the display device 1, a display mode is adapted to switch between the projection display mode and the two-way display mode in the display device 1A. In other words, the control section 18 in the first modification controls the entering and exiting motions of the beam splitter 15 so that a display mode is switched between the projection display mode and the two-way display mode.

[Projection Display Mode]

Figure 6:
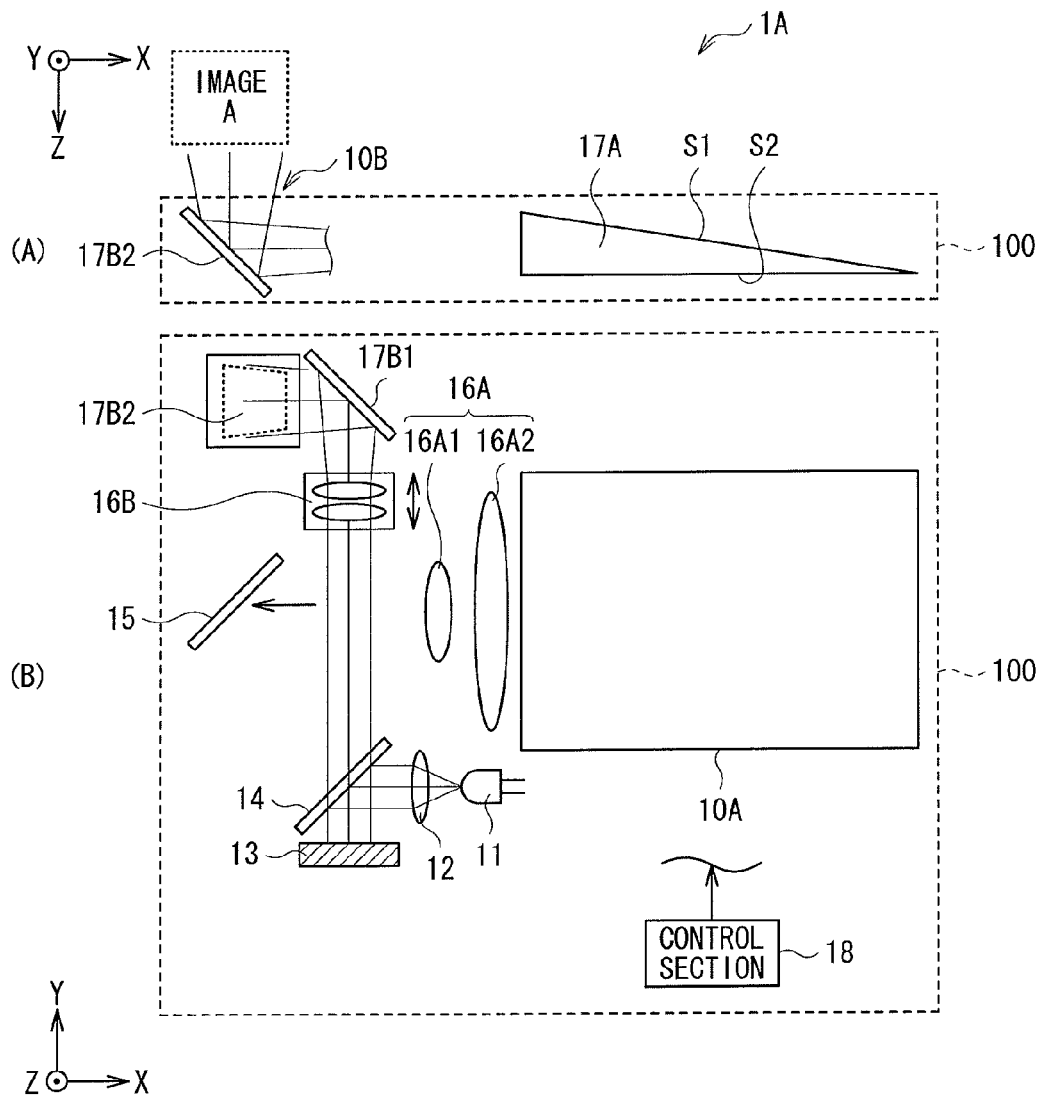
FIG. 6 is a schematic view illustrating an example of the operation of the display device shown in FIG. 5 in the projection display mode.

First, in the projection display mode shown in (A) and (B) of FIG. 6, the control section 18 controls the entering and exiting motions of the beam splitter 15 so that the beam splitter 15 is off the path of the picture light (is located outside the path of the picture light), as shown in (A) of FIG. 6. In this way, the picture light emitted from the polarization beam splitter 14 is selectively emitted to the projection lens 16B, and only the projection display using the projection lens 16B is performed (see "Image A" in the drawing), as shown in (A) of FIG. 6. This is a switching of a display mode to the projection display mode.

[Two-Way Display Mode (Identical Image Display)]

Figure 7:
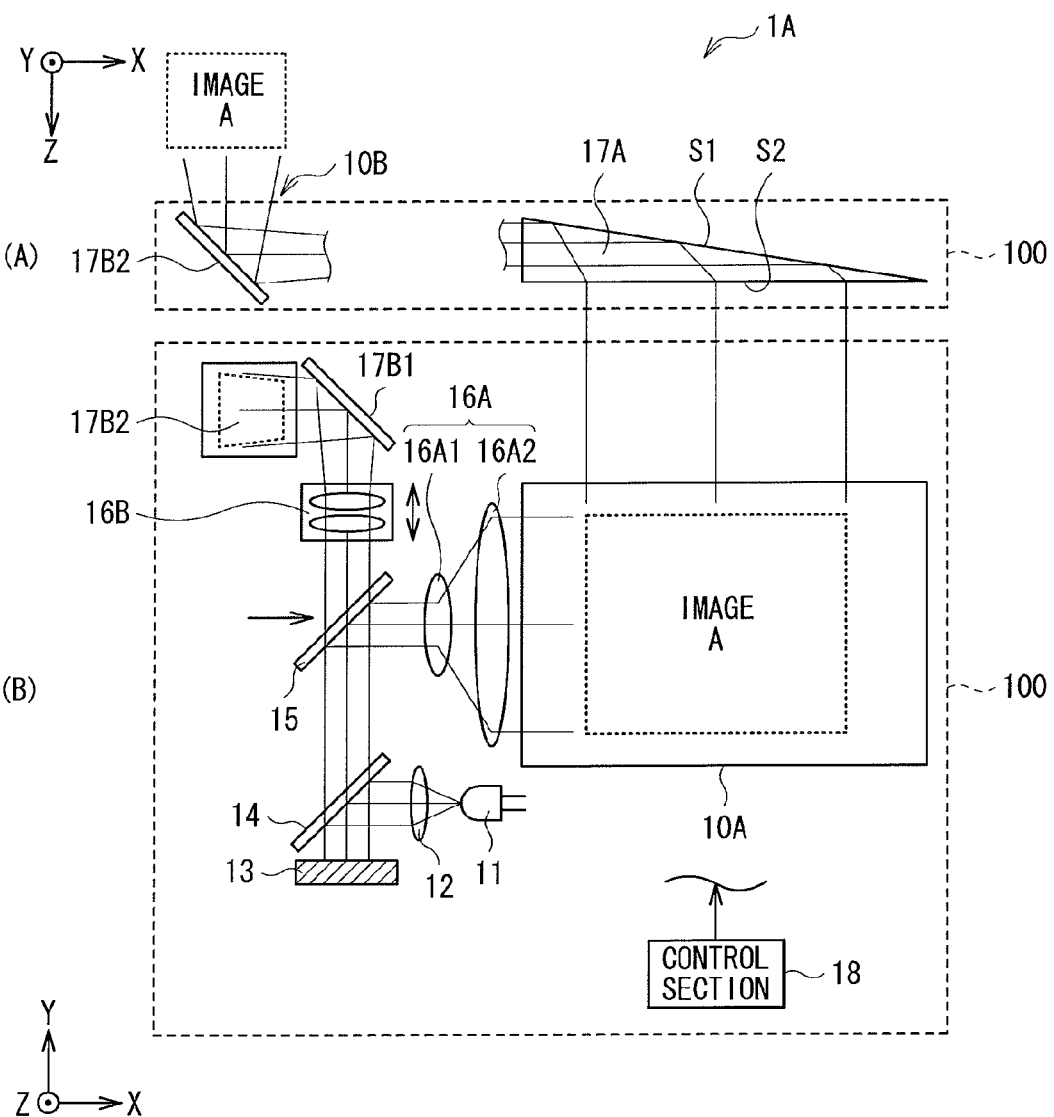
FIG. 7 is a schematic view illustrating an example of the operation of the display device shown in FIG. 5 in the two-way display mode (identical image display).

On the other hand, in the two-way display mode shown in (A) and (B) of FIG. 7, the control section 18 controls the entering and exiting motions of the beam splitter 15 so that the beam splitter 15 is located within the path of the picture light, as shown in (A) of FIG. 7. In this way, the picture light emitted from the polarization beam splitter 14 is emitted to both of the direct-view display section 10A and the projection lens 16B, as shown in (A) and (B) of FIG. 7. As a result, direct-view display is performed in the direct-view display section 10A and projection display using the projection lens 16B is performed (see "Image A" in the drawing). This is a switching of a display mode to the two-way display mode. In the two-way display mode of the first modification, an identical image (Image A) is displayed in the direct-view display and the projection display (first two-way display mode).

In the first modification, since the control section 18 is configured to control the entering and exiting motions of the beam splitter 15 so that a display mode is switched between the projection display mode and the two-way display mode, similar advantages to those in Embodiment are obtained. In other words, switching between various types of display modes is achieved, thereby increasing users' convenience.

[Second Modification]

Figure 8:
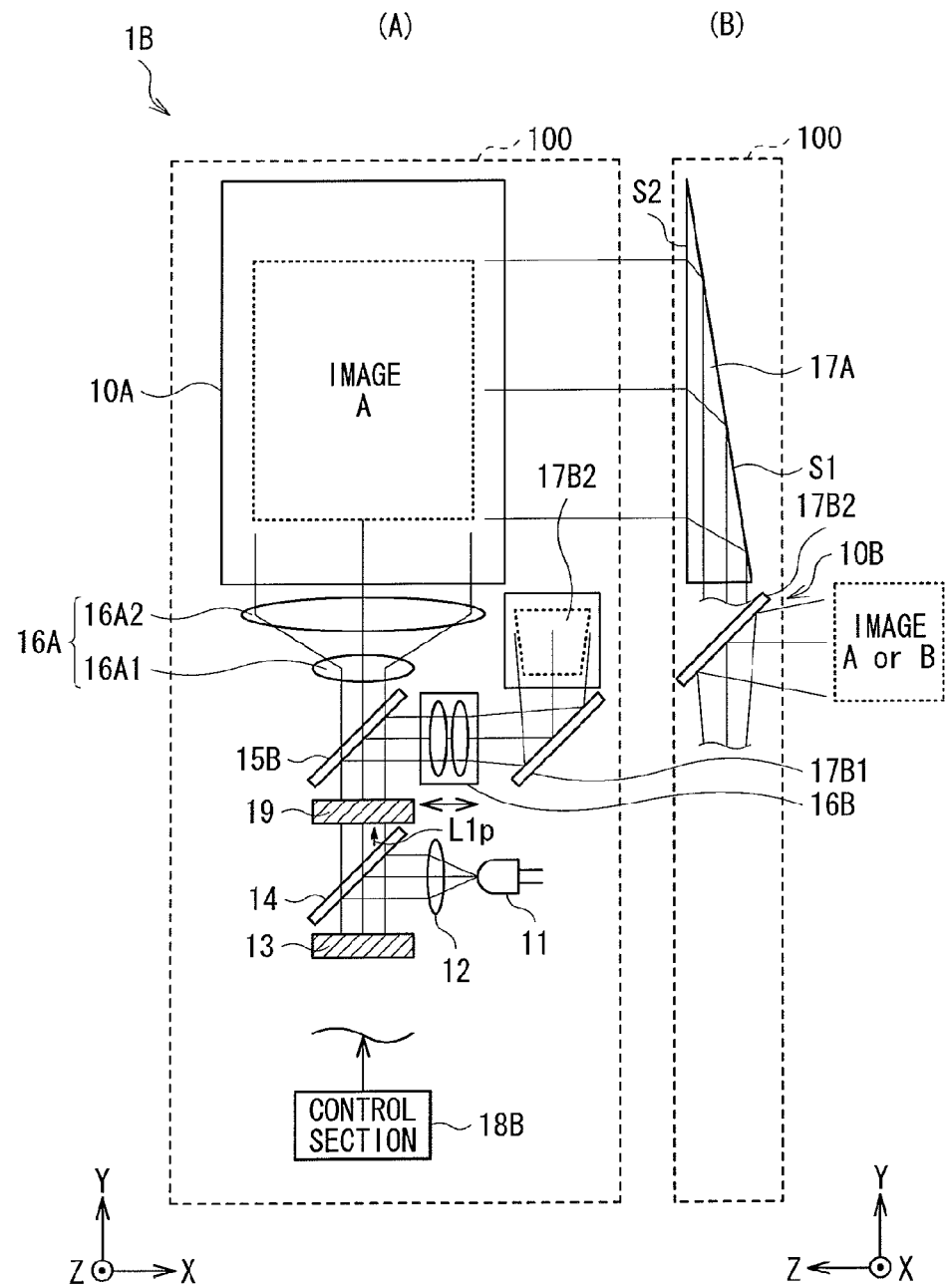
FIG. 8 is a schematic view illustrating an example of the entire configuration of a display device according to a second modification.

FIG. 8 is a schematic view illustrating the entire configuration of the display device (display device 1B) according to the second modification. (A) and (B) of FIG. 8 illustrate a plane configuration (X-Y plane configuration) viewed from the front side and a side configuration (Y-Z plane configuration), respectively. It is to be noted that (B) of FIG. 8 only shows a part of the configuration for easier illustration.

The display device 1B of the second modification is the display device 1 of Embodiment modified so that a polarization beam splitter 15B and a control section 18B are provided instead of the beam splitter 15 and the control section 18, respectively, and a liquid crystal device 19 (polarization controller) is further provided. The polarization beam splitter 15B and the liquid crystal device 19 each correspond to an example of the "optical member" in the present disclosure.

The liquid crystal device 19 is a device (polarization controller) which controls the state of polarization of the picture light emitted from the polarization beam splitter 14 and emits the picture light to the polarization beam splitter 15B. More specifically, the liquid crystal device 19 controls the state of polarization of the picture light (p-polarized light L1p, in this case) emitted from the polarization beam splitter 14 and emits the picture light as a p-polarized light, s-polarized light, or a mixture of a p-polarized light and an s-polarized light in a predetermined mixing ratio.

The polarization beam splitter 15B is an optical member which emits, to at least one of the direct-view display section 10A and the projection lens 16B described below, the picture light modulated by the reflection liquid crystal device 13 and entering the polarization beam splitter 15 via the polarization beam splitter 14 and the liquid crystal device 19. More specifically, the polarization beam splitter 15B is capable of controlling the direction of emission (selecting the direction of travelling) by emitting incident picture light according to the state of polarization thereof. As in the polarization beam splitter 14, the polarization beam splitter 15B selectively allows a specific polarized light (for example, p-polarized light) to transmit as well as selectively allows another polarized light (for example, s-polarized light) to reflect. With the operation of the polarization beam splitter 15B, when incident light from the liquid crystal device 19 is a specific polarized light (for example, s-polarized light), the incident light is selectively reflected to be emitted to the projection lens 16B, while when the incident light from the liquid crystal device 19 is another polarized light (for example, p-polarized light), the incident light is selectively transmitted to be emitted to the direct-view display section 10A.

The control section 18B has, as in the control section 18, a function of supplying a picture signal to the reflection liquid crystal device 13 and a function of performing control to make the projection lens 16B move in the optical axis direction in response to the operation to the focus adjustment switch SW2. Further, the control section 18B has a function of controlling the amount of light emission from the light source 11, as described below.

Furthermore, the control section 18B controls the operation, of the liquid crystal device 19, of controlling the state of polarization of the picture light in response to the operation to the display mode selector switch SW1. By allowing the control section 18B to control the operation of the liquid crystal device 19, it is possible to control the emission direction of the picture light as in Embodiment, thereby enabling switching a display mode between at least two types of display modes.

More specifically, the control section 18B in the second modification controls the operation of the liquid crystal device 19 so that a display mode is switched between the direct-view display mode, the projection display mode, and the two-way display mode. Further, the control section 18B controls at least the operation of the liquid crystal device 19 so that a display mode is also switch between the mode in which an identical image is displayed in the direct-view display and the projection display (first two-way display mode) and the mode in which different images are displayed in the direct-view display and the projection display (second two-way display mode) of the two-way display mode. That is, in the display device 1B of the second modification, a display mode is switched between the above four types of display modes. Thus, the display device 1B realizes switching of a display mode between a larger number of types of display modes than the display devices 1 and 1A. Hereinafter, the display mode switching operation of the control section 18B will be described in detail.

[Direct-View Display Mode]

Figure 9:
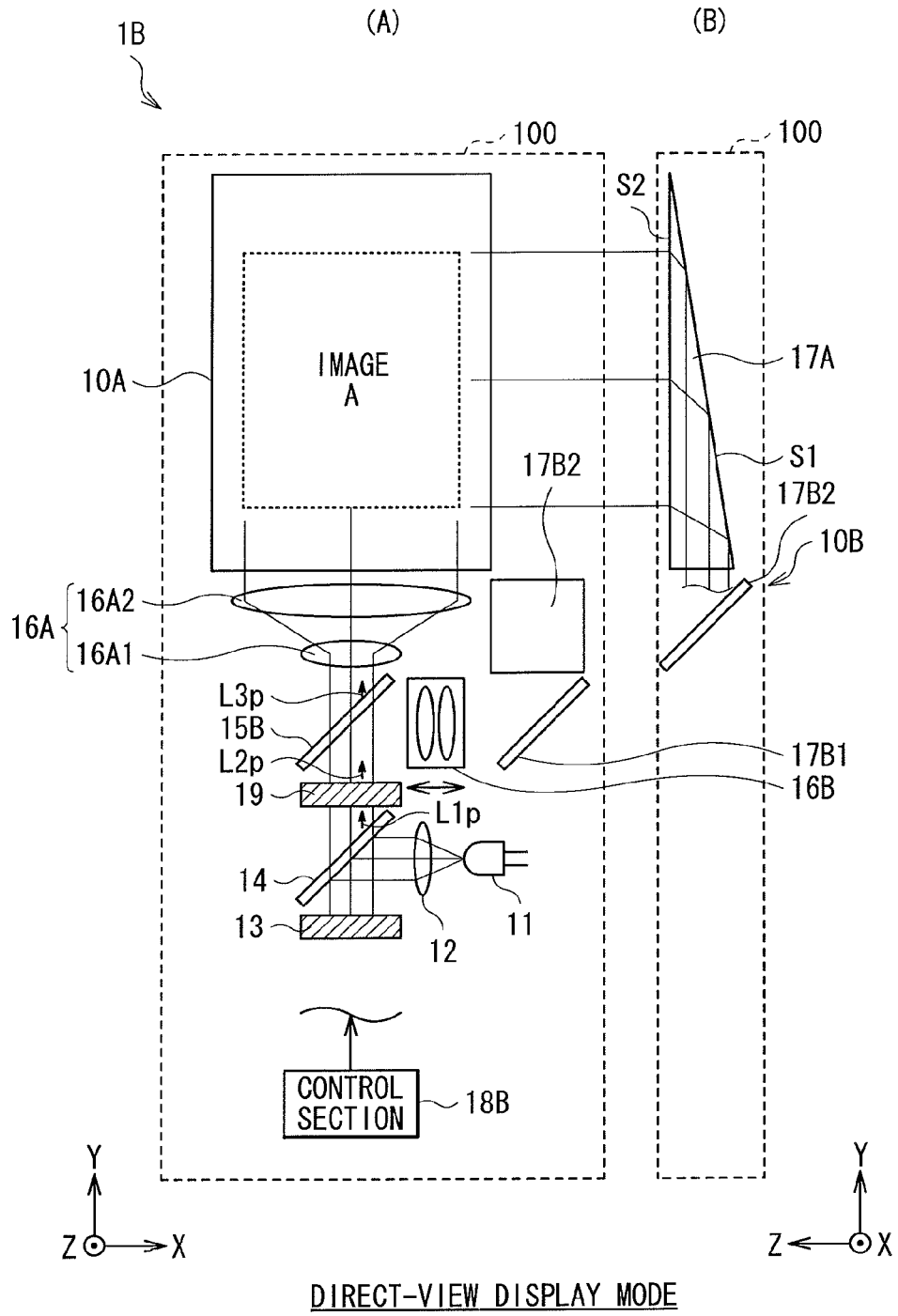
FIG. 9 is a schematic view illustrating an example of the operation of the display device shown in FIG. 8 in the direct-view display mode.

First, in the direct-view display mode shown in (A) and (B) of FIG. 9, the control section 18B controls the operation of the liquid crystal device 19 so that the picture light emitted from the liquid crystal device 19 is a p-polarized light (p-polarized light L2p), as shown in (A) of FIG. 9. In this way, the picture light emitted from the polarization beam splitter 14 transmits through the polarization beam splitter 15B (p-polarized light L3p) to be selectively emitted to the direct-view display section 10A, as shown in (A) of FIG. 9. As a result, only the direct-view display is performed in the direct-view display section 10A (see "Image A" in the drawing). This is switching of a display mode to the direct-view display mode.

[Projection Display Mode]

Figure 10:
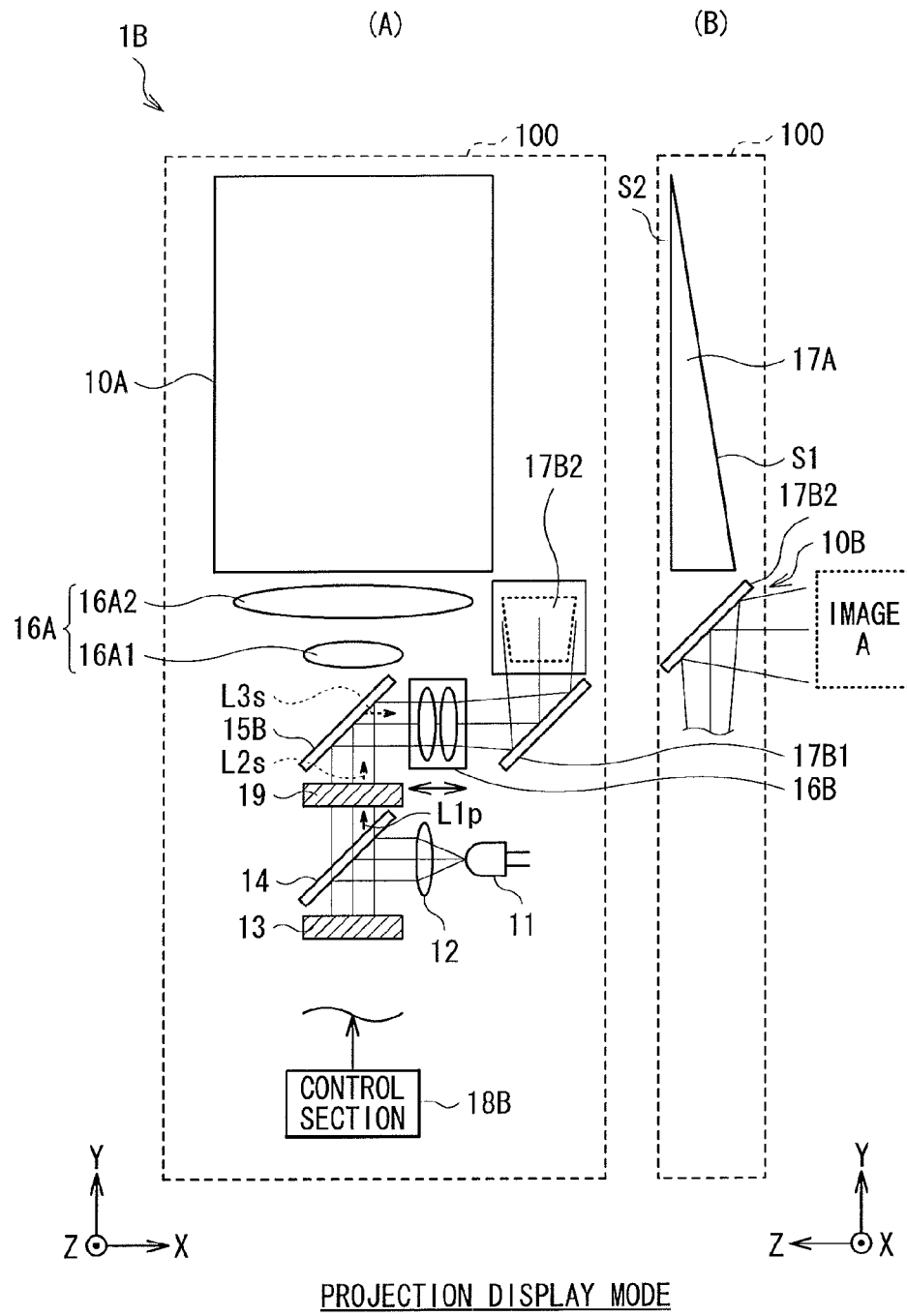
FIG. 10 is a schematic view illustrating an example of the operation of the display device shown in FIG. 8 in the projection display mode.

In the projection display mode shown in (A) and (B) of FIG. 10, the control section 18B controls the operation of the liquid crystal device 19 so that the picture light emitted from the liquid crystal device 19 is an s-polarized light (s-polarized light L2s), as shown in (A) of FIG. 10. In this way, the picture light emitted from the polarization beam splitter 14 is reflected by the polarization beam splitter 15B (s-polarized light L3s) to be selectively emitted to the projection lens 16B, as shown in (A) of FIG. 10. As a result, only the projection display using the project lens 16B is performed (see Image A in the drawing). This is switching of a display mode to the projection display mode.

[Two-Way Display Mode 1 (Identical Image Display)]

Figure 11:
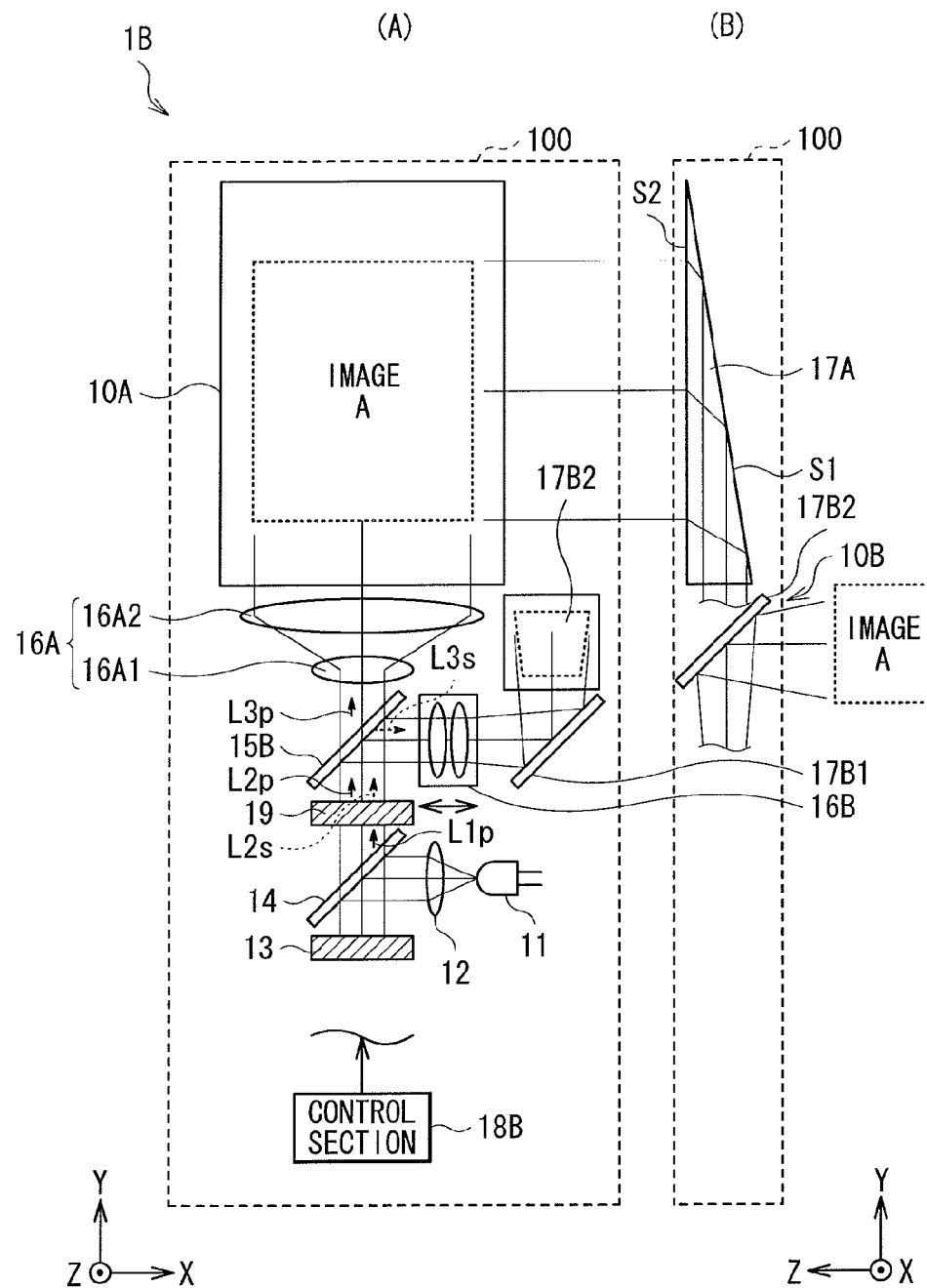
FIG. 11 is a schematic view illustrating an example of the operation of the display device shown in FIG. 8 in the two-way display mode 1 (identical image display).

In the two-way display mode 1 (identical image display) shown in (A) and (B) of FIG. 11, the control section 18B controls the operation of the liquid crystal device 19 so that the picture light emitted from the liquid crystal device 19 is a p-polarized light (p-polarized light L2p) and an s-polarized light (s-polarized light L2s), as shown in (A) of FIG. 11. In this way, the picture light emitted from the polarization beam splitter 14 is transmitted through the polarization beam splitter 15B (p-polarized light L3p) as well as is reflected by the polarization beam splitter 15B (s-polarized light L3s), as shown in (A) and (B) of FIG. 11. This means that the picture light is emitted to both of the direct-view display section 10A and the projection lens 16B. As a result, the direct-view display is performed in the direct-view display section 10A and the projection display using the project lens 16B is performed (see "Image A" in the drawing). This is switching of a display mode to the two-way display mode 1 (the identical image display). Further, since an identical image (Image A in this case) is displayed in the direct-view display and the projection display in the two-way display mode 1 as shown in the drawing, the two-way display mode 1 corresponds to the first two-way display mode described above.

In the two-way display mode 1 (identical image display: first two-way display mode), there are the following two methods as methods for controlling the state of polarization of picture light in the liquid crystal device 19.

One of them is to allow the control section 18B to control the operation of the liquid crystal device 19 so that two types of polarized lights (the p-polarized light L3p, and the s-polarized light L3s, in this case) are mixed in the picture light emitted from the liquid crystal device 19. More specifically, this is a method of controlling the dispersion ratio of the lights emitted to the direct-view display section 10A and the projection lens 16B, by controlling the polarization angles in the liquid crystal device 19. In other words, according to this method, the angle of rotation of polarization is set to the value intermediate between 0, degree and 90 degrees instead of emitting the picture light incident to the liquid crystal device 19 as a p-polarized light or an s-polarized light. At this time, the luminance ratio between the direct-view display and the projection display may be controlled in such a manner that the control section 18B controls the mixing ratio of the two types of polarized lights (p-polarized light L3p, and s-polarized light L3s) in the picture light emitted from the liquid crystal device 19.

The other of them is to allow the control section 18B to control the operation of the liquid crystal device 19 so that the state of polarization of the picture light to be emitted from the liquid crystal device 19 is switched between two types (p-polarized light L3p, and s-polarized light L3s) in a time-division manner. At this time, the luminances of the direct-view display and the projection display may be individually controlled in such a manner that the control section 18B separately controls the amount of light emission from the light source 11 in each of the respective periods for which the respective picture lights in the two different states of polarizations, namely, the p-polarized light L3p, and the s-polarized light L3s, are emitted.

[Two-Way Display Mode 2 (Different Image Display)]

Figure 12:
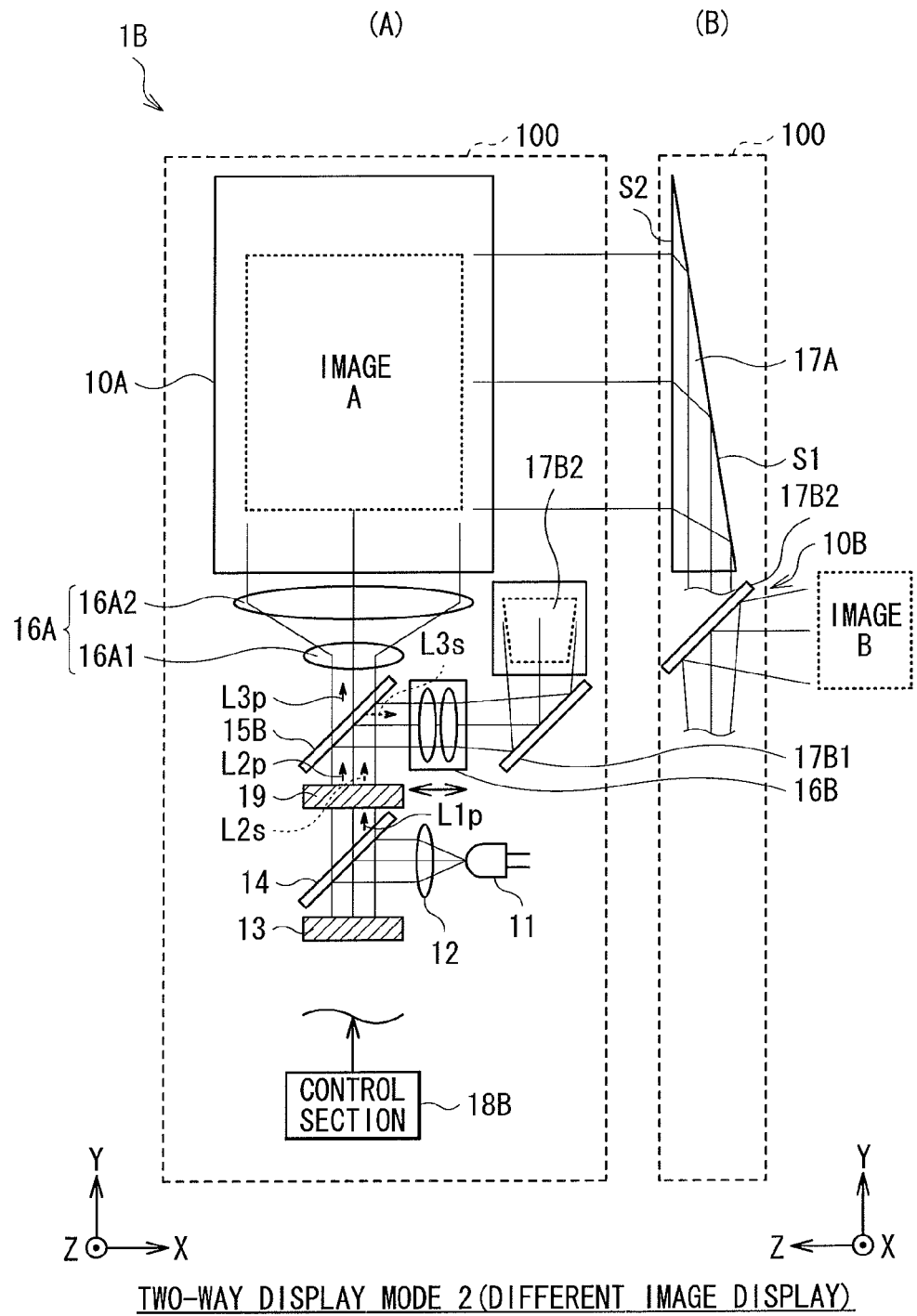
FIG. 12 is a schematic view illustrating an example of the operation of the display device shown in FIG. 8 in the two-way display mode 2 (different image display).

On the other hand, in the two-way display mode 2 (different image display) shown in (A) and (B) of FIG. 12, the control section 18B controls the operations of the reflection liquid crystal device 13 and the liquid crystal device 19 so that a first period and a second period, which will be described below, are provided in a time-division manner (on a frame-by-frame basis, for example). The first period is a period in which a certain picture light (for example, "Image A" for direct-view display shown in (A) of FIG. 12) is emitted from the reflection liquid crystal device 13 as well as is controlled to be in a certain state of polarization (p-polarized light L3p, in this case) by the liquid crystal device 19. The second period is a period in which another picture light (for example, "Image B" for projection display shown in (B) of FIG. 12) is emitted from the reflection liquid crystal device 13 as well as is controlled to be in another state of polarization (s-polarized light L3s, in this case) by the liquid crystal device 19. The control section 18B controls the operations of the reflection liquid crystal device 13 and the liquid crystal device 19 so that the two periods are alternately switched.

In the way described above, in the first period, the picture light (p-polarized light L1p) emitted from the polarization beam splitter 14 becomes the p-polarized light L2p, by being controlled with respect to the state of polarization thereof by the liquid crystal device 19, and is transmitted through the polarization beam splitter 15B (p-polarized light L3p). Therefore, in the first period, the picture light is selectively emitted to the direct-view display section 10A, and only direct-view display of "Image A", for example, is performed in the direct-view display section 10A.

On the other hand, in the second periods, the picture light (p-polarized light L1p) emitted from the polarization beam splitter 14 becomes the s-polarized light L2s, by being controlled with respect to the state of polarization thereof by the liquid crystal device 19, and is reflected by the polarization beam splitter 15B (s-polarized light L3s). Therefore, in the second period, the picture light is selectively emitted to the projection lens 16B, and only projection display of "Image B", for example, is performed using the projection lens 16B.

Since the two-way display mode 2 is a mode in which different images (Images A and B in this case) are displayed in the direct-view display and the projection display as shown in the drawing, this mode corresponds to the second two-way display mode described above. At this time, the luminances of the direct-view display and the projection display may be individually controlled by separately controlling the respective amounts of light emission from the light source 11 in the first and second periods.

In the two-way display mode 2, when original image is to be produced at 30, fps (frame per second), 15, frames of the image are output to the direct-view display section 10A and the other 15, frames of image are output to the projection lens 16B. In other words, although the frame rate is made half by time division, the frame rate of the original image and driving frequency may be doubled, for example, to prevent such reduction in frame rate.

As described above, in the second modification, the control section 18B controls the operations of the reflection liquid crystal device 13 and the liquid crystal device 19 so that a display mode is switched between the four types of display modes, namely, the direct-view display mode, projection display mode, two-way display mode 1 (identical image display), and two-way display mode 2 (different image display). This enables the display device 1B of the second modification to achieve switching a display mode between a larger number of types of display modes than in the display devices 1 and 1A, thereby increasing users' convenience.

Further, since the two-way display mode 2 displays different images (Images A and B) in the direct-view display and the projection display, displaying a captured image in the projection display while displaying a control panel to be used in touch panel operation in the direct-view display, for example, is made possible.

[Third Modification]

Figure 13:
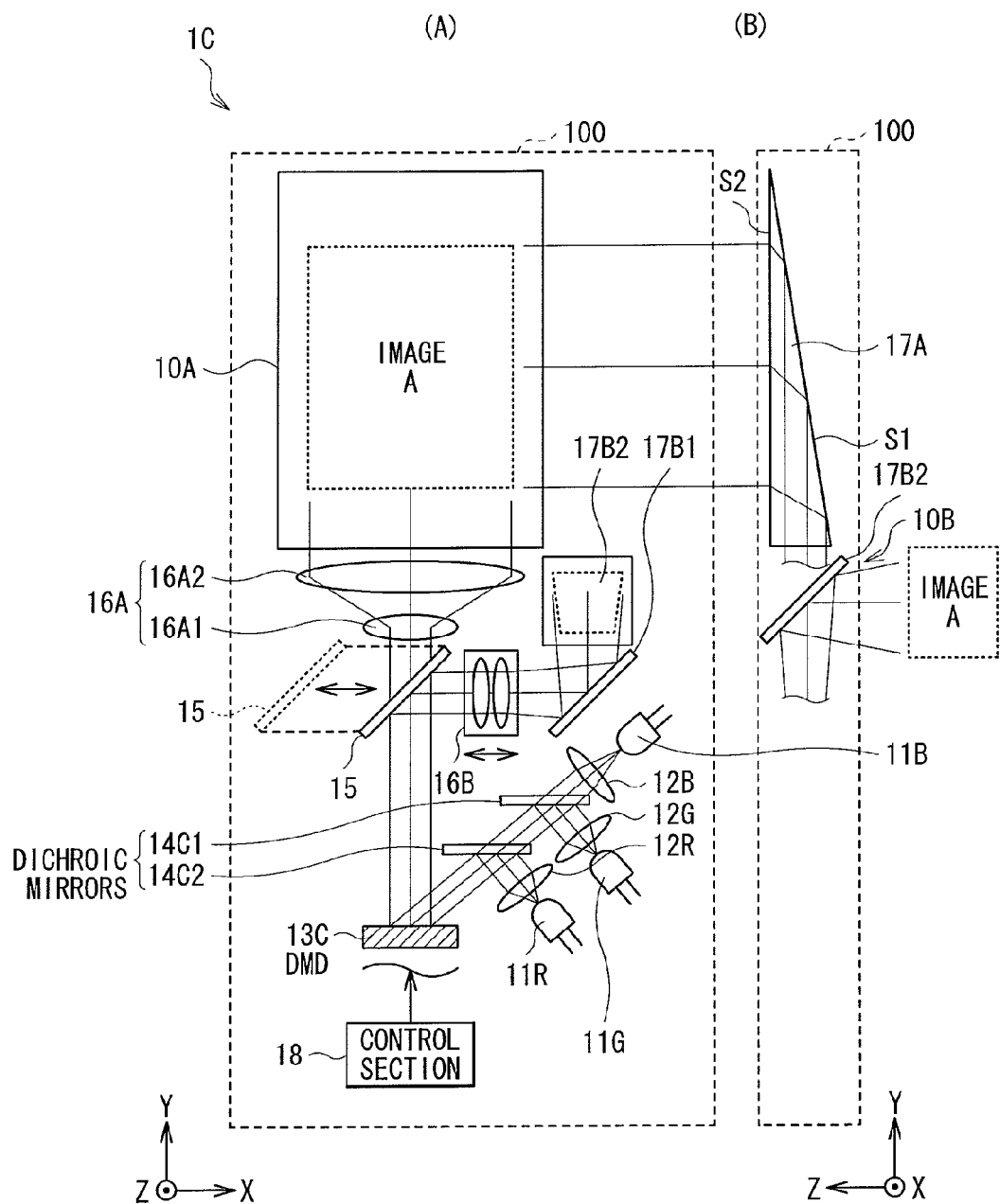
FIG. 13 is a schematic view illustrating an example of the entire configuration of a display device according to a third modification.

FIG. 13 is a schematic view illustrating the entire configuration of a display device (display device 1C) according to the third modification. (A) and (B) of FIG. 13 illustrate a plane configuration (X-Y plane configuration) viewed from the front side and a side configuration (Y-Z plane configuration), respectively. It is to be noted that (B) of FIG. 13 only shows a part of the configuration for easier illustration.

The display device 1C of the third modification is the display device 1 of Embodiment modified so that a red light source 11R, a green light source 11G, a blue light source 11B, collimator lens 12R and 12G, and 12B, dichroic mirrors 14C1 and 14C2, and a DMD (Digital Micromirror Device) 13C are provided instead of the light source 11, collimator lens 12, reflection liquid crystal device 13, and polarization beam splitter 14. This means that the configuration of the optical systems used for both of the direct-view display and the projection display, which are located in front of the beam splitter 15, is changed from that in the display device 1.

The red, green, and blue light sources 11R, 11G, and 11B emit red, green, and blue lights, respectively. These light sources form a light source section. As the three types of light sources, red, green, and blue LEDs, for example, may be used, respectively. Alternatively, red, green, and blue lasers, or a combination of the LEDs and lasers may be used. As one example, the red, green, and blue lights have wavelengths $\lambda r$, $\lambda g$, and $\lambda b$ of approximately 600, nm to 700, nm, 500, nm to 600, nm, and 400, nm to 500, nm, respectively.

The collimator lenses 12G and 12B serve to collimate (parallelize) a green light emitted from the green light source 11G and a blue light emitted from the blue light source 11B and couple the thus-collimated lights to the dichroic mirror 14C1. Likewise, the collimator lens 12R serves to collimate (parallelize) a red light emitted from the red light source 11R and couple the thus-collimated light to the dichroic mirror 14C2. That is, the collimator lenses 12R, 12G, and 12B serve to individually parallelize and then emit the respective incident lights (red, green, and blue lights) from the three types of light sources (red, green, and blue light sources 11R, 11G, and 11B). Therefore, the display device 1C of the third modification is configured to include the same number of collimator lenses (three collimator lenses 12R, 12G, and 12B in this case) as that of the light sources (three in this case).

The dichroic mirror 14C1 selectively allows the blue incident light having been parallelized by the collimator lens 12B to transmit, as well as selectively allows the green incident light having been parallelized by the collimator lens 12G to reflect. The dichroic mirror 14C2 selectively allows the green and blue lights emitted from the dichroic mirror 14C1 to transmit, as well as selectively allows the red incident light having been parallelized by the collimator lens 12R to reflect. With the above mirrors, color synthesis (optical path synthesis) is performed to the red, green, and blue lights. In other words, the dichroic mirrors 14C1 and 14C2 as a whole perform the optical path synthesis to the respective parallel lights emitted from the collimator lenses 12R, 12G, and 12B. Instead of the dichroic mirrors 14C1 and 14C2, a pair of dichroic prisms may be provided.

The DMD 13C is an optical modulator which modulates each of the respective lights emitted from the red, green, and blue light sources 11R, 11G, and 11B based on a picture signal supplied from the control section 18 and emits a picture light. Specifically, a beam image is created by controlling switching of mirror inclination in order to control the amount of reflected light.

In the display device 1C of the third modification, the respective lights emitted from the red, green, and blue light sources 11R, 11G, and 11B are collimated by the collimator lenses 12R, 12G, and 12B, respectively, to become parallel lights. After that, color synthesis (optical path synthesis) is performed to the thus-obtained parallel lights by the dichroic mirrors 14C1 and 14C2. Each of the parallel lights on which the optical path synthesis has been performed enters the DMD 13C, and is reflected while being modulated by a picture signal, thereby being emitted as a picture light. The subsequent operations are the same as in the display device 1.

At this time, the red, green, and blue light sources 11R, 11G, and 11B sequentially generate lights (pulse light generation) in a time-division manner and emit lights of the corresponding colors (red, green, and blue, respectively). Further, based on the picture signals of the colors components (red, green, and blue), the DMD 13C sequentially modulates lights of the corresponding colors in a time-division manner. In this way, the display device 1C performs color picture display based on picture signals.

The display device 1C of the third modification thus configured offers similar advantages as those of the display device 1 of Embodiment by the similar operations to those of the display device 1. In detail, since the control section 18 controls the entering and exiting motions of the beam splitter 15 so that a display mode is switched between the direct-view display mode and the two-way display mode, it is possible to switch a display mode between various types of display modes, thereby increasing users' convenience.

[Fourth Modification]

Figure 14:
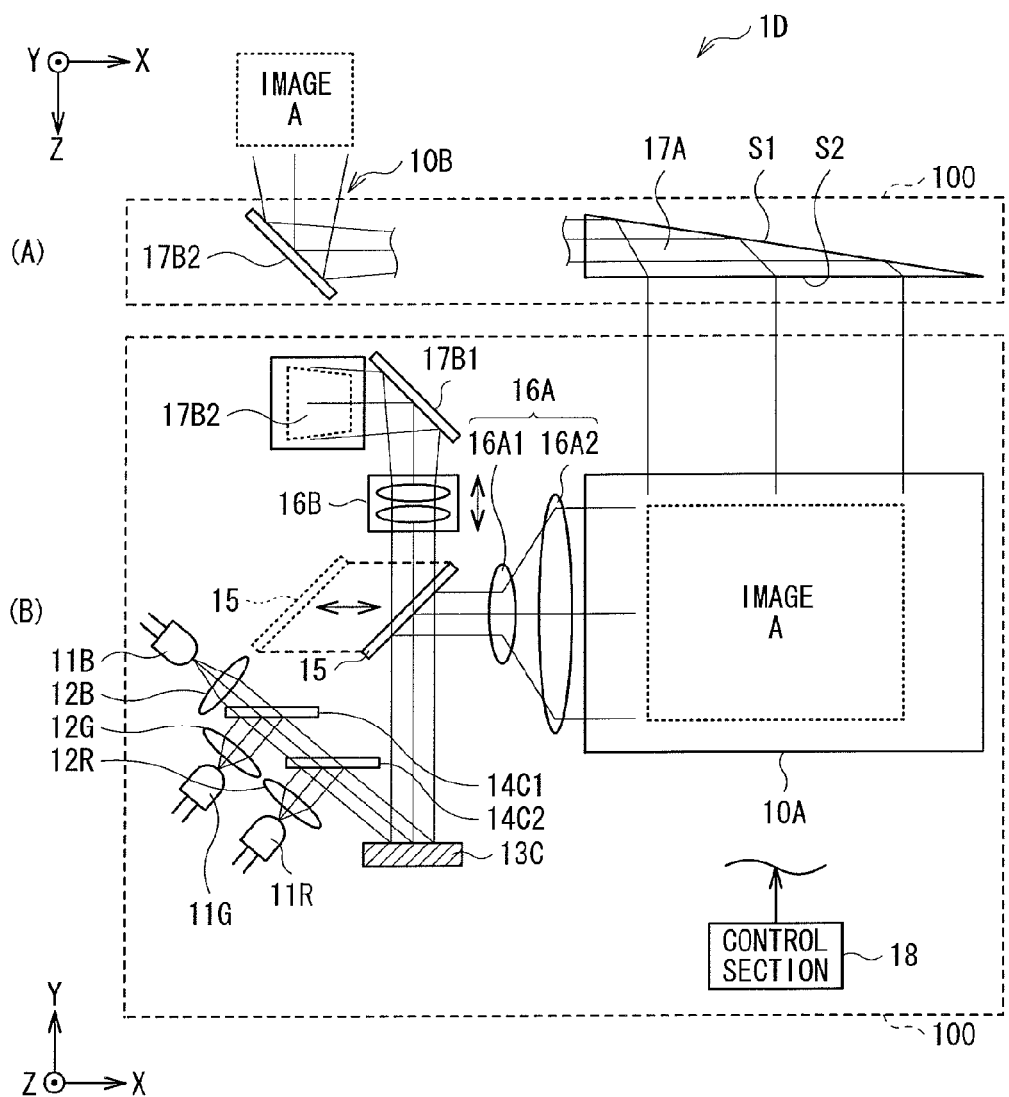
FIG. 14 is a schematic view illustrating an example of the entire configuration of a display device according to a fourth modification.

FIG. 14 is a schematic view illustrating the entire configuration of a display device (display device 1D) according to the fourth modification. (A) and (B) of FIG. 14 illustrate a side configuration (Z-X plane configuration) and a plane configuration (X-Y plane configuration) viewed from the front side, respectively. It is to be noted that (A) of FIG. 14 only shows a part of the configuration for easier illustration.

The display device 1D of the fourth modification is the display device 1A of the first modification modified so that the red, green, blue light sources 11R, 11G, 11B, collimator lenses 12R, 12G, and 12B, dichroic mirrors 14C1 and 14C2, and DMD 13C are provided instead of the light source 11, collimator lens 12, reflection liquid crystal device 13, and polarization beam splitter 14. This means that the configuration of the optical systems used for both of the direct-view display and the projection display, which are located in front of the beam splitter 15 of the display device 1A, is changed, as in the third modification.

The display device 1D of the fourth modification also offers similar advantages as those of the display device 1A of the first modification by the similar operations to those of the display device 1A. In detail, since the control section 18 controls the entering and exiting motions of the beam splitter 15 so that a display mode is switched between the projection display mode and the two-way display mode, it is possible to switch a display mode between various type of display modes, thereby increasing users' convenience.

[The Fifth Modification]

Figure 15:
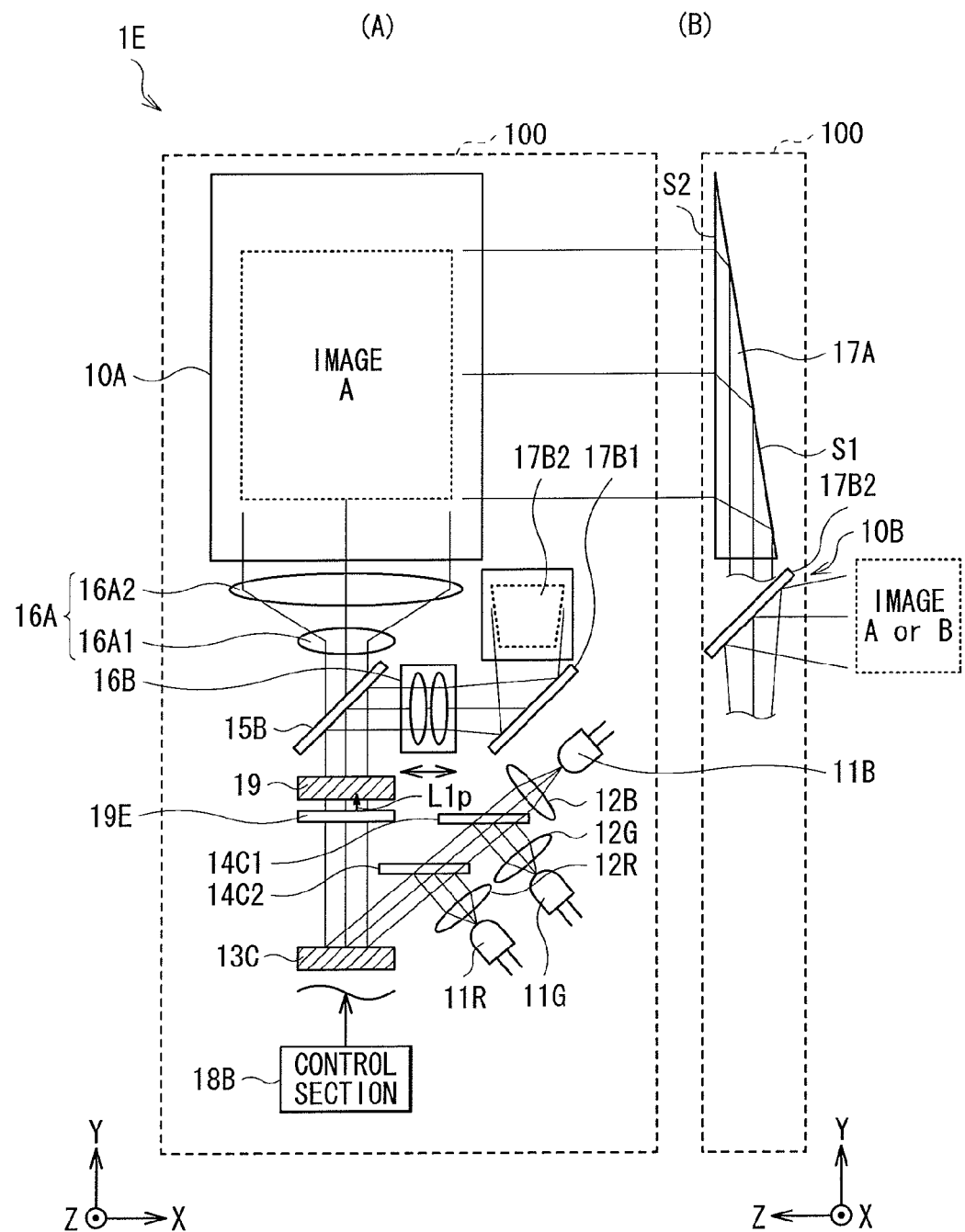
FIG. 15 is a schematic view illustrating an example of the entire configuration of a display device according to a fifth modification.

FIG. 15 is a schematic view illustrating the entire configuration of a display device (display device 1E) according to the fifth modification. (A) and (B) of FIG. 15 illustrate a plane configuration (X-Y plane configuration) viewed from the front side and a side configuration (Y-Z plane configuration), respectively. It is to be noted that (B) of FIG. 15 only shows a part of the configuration for easier illustration.

The display device 1E of the fifth modification is the display device 1B of the second modification modified so that the red, green, blue light sources 11R, 11G, and 11B, collimator lenses 12R, 12G, and 12B, dichroic mirrors 14C1 and 14C2, and DMD 13C are provided instead of the light source 11, collimator lens 12, reflection liquid crystal device 13, and polarization beam splitter 14. This means that the configuration of the optical systems used for both of the direct-view display and the projection display, which are located in front of the liquid crystal device 19 of the display device 1B, is changed, as in the third and fourth modifications.

The display device 1E further includes a polarizer 19E on the optical path between the DMD 13C and the liquid crystal device 19. The polarizer 19E serves to make picture light of unpolarized light emitted from the DMD 13C a predetermined polarized light (p-polarized light L1p, in this case) and emit the polarized light to the liquid crystal device 19 (i.e., the polarizer 19E converts the unpolarized picture light into a specific polarized light and allows the specific polarized light to travel toward the liquid crystal device 19). That is, the polarizer 19E selectively allows a specific polarized light (p-polarized light in this case) of incident picture light of unpolarized light to transmit, and selectively allows another polarized light thereof (s-polarized light in this case) to reflect. One reason for providing the modulator 19E in the fifth modification is that the emitted light is made unpolarized since the DMD 13C is a mirror device. The presence of the modulator 19E enables a picture light of a specific polarized light (p-polarized light L1p) to enter the liquid crystal device 19 in the display device 1E of the fifth modification, as in the display device 1B of the second modification.

Thus, the display device 1E of the fifth modification also offers similar advantages to those of the display device 1B of the second modification by the similar operations to those of the display device 1B. In detail, since the control section 18B controls the operations of the reflection liquid crystal device 13 and the liquid crystal device 19 so that a display mode is switched between the four types of display modes, namely, the direct-view display mode, projection display mode, two-way display mode 1 (identical image display), and two-way display mode 2 (different image display), it is possible to switch a display mode between a larger number of types of display modes, thereby increasing users' convenience.

[Sixth Modification]

Figure 16:
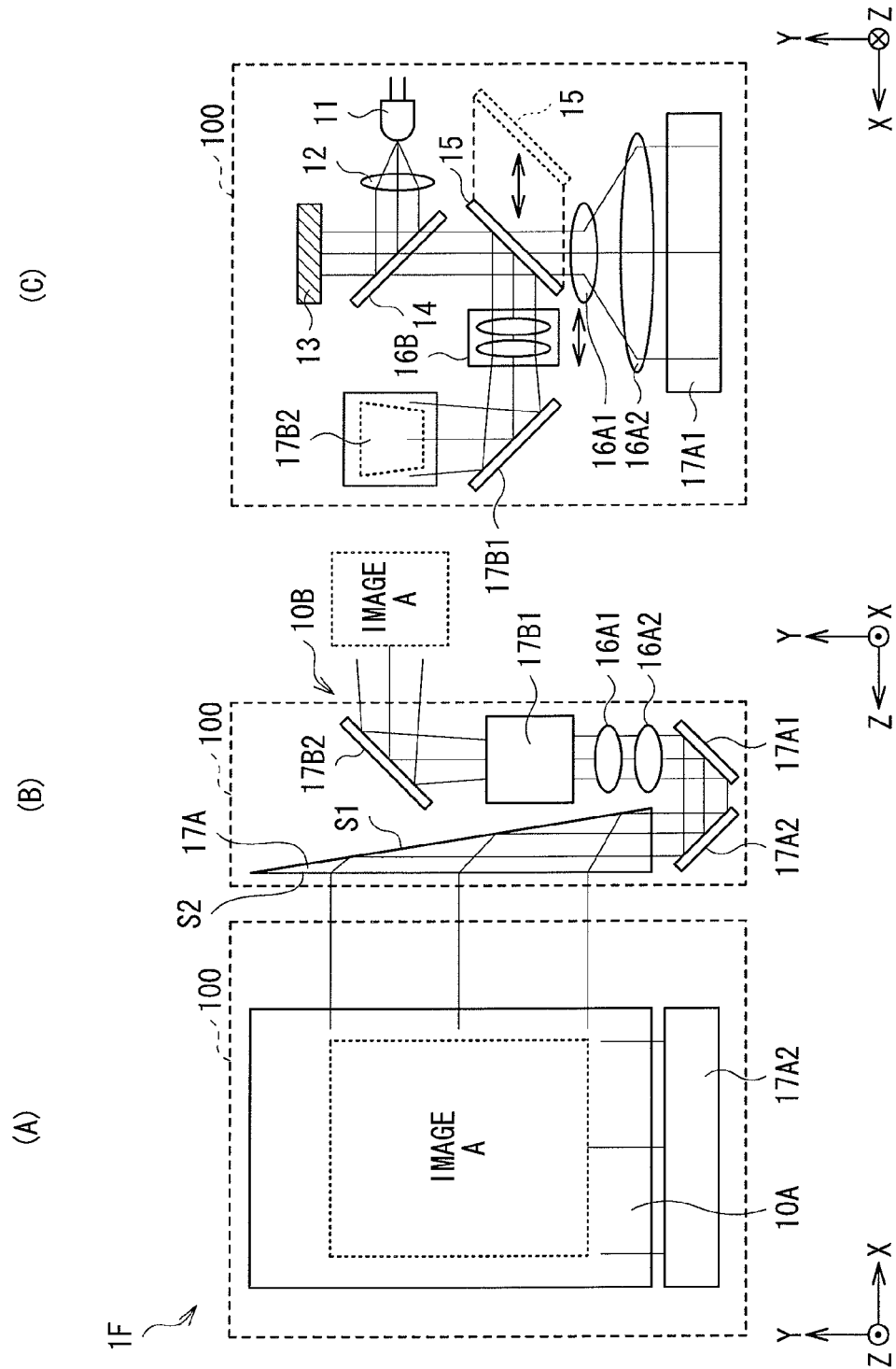
FIG. 16 is a schematic view illustrating an example of the entire configuration of a display device according to a sixth modification.

FIG. 16 is a schematic view illustrating the entire configuration of a display device (display device 1F) according to the sixth modification. (A), (B), and (C) of FIG. 16 illustrate a plane configuration (X-Y plane configuration) viewed from the front side, a side configuration (Y-Z plane configuration), and a plane configuration (X-Y plane configuration) viewed from the back side, respectively. It is to be noted that a part of the configuration (for example, the control section 18) are adequately omitted in FIG. 16 for easier illustration.

The display device 1F of the sixth modification is the display device 1 of Embodiment modified so that a pair of mirrors 17A1 and 17A2 are further provided on the optical path between the expander lenses 16A (16A1 and 16A2) as a pair of magnifying optical systems and the prism 17A.

The mirrors 17A1 and 17A2 is for bending the path of the light (picture light) emitted from the expander lens 16A (bending at an angle of approximately 180, degrees in the Y-axis direction in this case) and outputting the emitted light to the prism 17A. It is to be noted that the mirrors 17A1 and 17A2 each correspond to an example of a "reflector" in the present disclosure.

The display device 1F of the sixth modification thus configured offers an advantage, in addition to the above advantages obtained in Embodiment, that it is possible to reduce the projected area viewed from the direct-view display section 10A, thereby reducing the size of the case 100 with respect to the X-Y plane.

Although the sixth embodiment is the display device 1 modified to further include the mirrors 17A1 and 17A2, the sixth modification is not limited thereto. For instance, the sixth embodiment may be any one of the display devices 1A to 1E modified to further include the mirrors 17A1 and 17A2.

[Other Modifications]

Although the present disclosure has been described with reference to the embodiment and modified examples, the present disclosure is not limited to these examples and various other modifications may be made thereto.

Specifically, although the reflection plane and the screen are made using the prism in, for example, Embodiment, they may be separate parts. For example, a reflection mirror which reflects light at its outer plane, and a screen having an incidence plane to which a dispersing agent is applied may be used. Further, although the above description shows the method of applying a dispersing agent to the direct-view display section (screen), other methods including a method of making the screen semi-transparent by using a wrinkly textured surface or sanding may be used as long as the screen allows light to transmit while being scattered.

Furthermore, although three types of light sources (red, green, and blue) are used in the third to fifth modifications, the types of lights sources usable in the present disclosure are not limited to the above three. For example, a white LED, a collimator lens, and a switching color filter may be used. The switching color filter is generally called a color wheel, which is typically used in a projector using a DMD. The color wheel includes a disc and a color filter which is divided into at least two different colored regions and is placed on the disc at its circumference, and is rotated for usage. In this case, the white LED, collimator lens, and color wheel are arranged so that the color filter interrupts the path of light which is emitted from the white LED and is made substantially parallel by the collimator lens. By rotating the disc of the color wheel, lights of colors corresponding to the color filter are repeatedly transmitted in a time-division manner. This means that arranging a color filter of red, green, and blue regions and rotating the disc lead to sequential and periodical emission of red, green, and blue lights. Therefore, the color wheel may be used as the light sources in the third to fifth modifications.

Moreover, although Embodiment, for example, relates to the example in which a display mode is switched in such a manner that control of the direction, with respect to the optical member, in which the picture light is emitted is performed in accordance with the control by the control section 18 in response to the operation of users to the display mode selector switch SW1 (switching section), the present disclosure is not limited to this example. More specifically, in the examples other than the second and fifth modifications (Embodiment, first, third, fourth, and sixth modifications), a display mode may be switched without the control by the control section 18 (without electrical control). In other words, a display mode may be switched in such a manner that control of the direction, with respect to the optical member, in which the picture light is emitted is directly (mechanically) performed (in this case, the entering and exiting motions of the beam splitter 15 are controlled) in response to the operation to the display mode selector switch SW1. Likewise, although Embodiment, for example, relates to the example in which the focus is adjusted (the projection lens 16B is moved in the optical axis direction) in accordance with the control by the control section 18 in response to the operation (of users) to the focus adjustment switch SW2, the present disclosure is not limited to this example. Specifically, the focus may be adjusted without the control by the control section 18 (without electrical control) in, for example, Embodiment. In other words, the focus may be directly (mechanically) adjusted (the projection lens 16B may be moved in the optical axis direction) in response to the operation to the focus adjustment switch SW2.

In addition, although Embodiment, for example, relates to the example in which the light source section is made of one or three types of light sources, two or four or more types of light sources, for example, may be used.

Moreover, although Embodiment, for example, relates to the example in which the optical modulator is a reflection liquid crystal device, the present disclosure is not limited to this example. Specifically, a transmission crystal liquid device, or optical modulators other than a crystal liquid device, for example, may be used.

Furthermore, although the components (optical systems) of the display device have been specifically described in, for example, Embodiment, all of the components are not necessary or other components may be added.

The display device according to one embodiment of the present disclosure is applicable to electronic equipment originally including monitor screens (direct-view display section), such as portable devices including video cameras, digital cameras, and portable cellular phones, or to electronic equipment originally having a function of projection.

The present disclosure contains subject matter related to that disclosed in Japanese Priority Patent Application JP 2010-211227, filed in the Japan Patent Office on Sep. 21, 2010,, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising:
   a light source configured to emit light;
   an optical modulator configured to (a) modulate light from the light source based on a picture signal, and (b) emit modulated light as a picture light;
   a direct-view display section configured to display an image on a display screen based on the picture light;
   a projection system configured to project an image on a projection screen based on the picture light;
   an optical member configured to direct the picture light from the optical modulator toward at least one of the direct-view display section and the projection system;
   a switch (a) that controls the direction of the picture light by the optical member, and (b) switches between a direct-view display mode, a projection display mode, a first two-way display mode allowing an identical image to be displayed in the direct-view screen and the projection display screen, and a second two-way display mode allowing different images to be displayed in the direct-view screen and the projection display screen, and
   a controller (a) comprising a polarization controller configured to polarize the picture light and a polarized beam splitter configured to direct the picture light from the polarization controller toward the direct-view display section or the projection optical system or both according to the polarization state of the picture light and (b) configured to control the direction of the picture light in response to the switch and the polarization controller in order to switch between the direct-view display mode, the projection display mode, and the first and second two-way display modes,
   wherein,
      in the direct-view display mode the picture light is directed toward the direct-view display section,
      in the projection display mode the picture light is directed toward the projection optical system,
      in the first and second two-way display modes the picture light is directed toward the direct-view display section and the projection optical system,
      in the first two-way display mode an identical image is displayed by the direct-view display and the projection display,
      in the second two-way display mode different images are displayed by the direct-view display and the projection display, and
      the second two-way display mode comprises (a) a first period where a first period picture light from the optical modulator is polarized in a first state by the polarization controller, and (b) a second period where a second period picture light from the optical modulator is polarized in a second state by the polarization controller.

2. The display device of claim 1, wherein the controller is configured to control the amount of light from the light source in the first and second periods and the luminances of the direct-view display and the projection display.

3. The display device of claim 1, wherein in the first two-way display mode, the polarization controller is configured to allow two types of polarized lights to be mixed in the picture light.

4. The display device of claim 3, wherein the controller is configured to control a luminance ratio between the direct-view display and the projection display.

5. The display device of claim 1, wherein in the first two-way display mode the polarization controller is configured to allow the polarization of the picture light to switch between two types of polarizations in a time-division manner.

6. The display device of claim 5, wherein the controller is configured to control an amount of light from the light source in (a) a first period where the first period allows the picture light with a first polarization state to be selected and (b) a second period, where the second period allows the picture light with a second polarization state to be selected.

7. The display device of claim 1, wherein the optical modulator emits an unpolarized picture light, and
the display device further includes a polarizer configured to convert the unpolarized picture light into a polarized light and direct the polarized light toward the polarization controller.

8. The display device of claim 1, wherein the optical member is a beam splitter.

9. The display device of claim 8, further comprising a beam splitter controller to the beam splitter in response to the switch.

10. The display device of claim 9, wherein:
the beam splitter controller controls the beam splitter in order to switch between the direct-view display mode and the two-way display mode when the first and second display modes are selected.

11. The display device of claim 9, wherein: the controller is configured to control the beam splitter in order to switch between the projection display mode and the two-way display mode when the first and second display modes are selected.

12. The display device of claim 1, further comprising:
a first beam expander between the optical member and the direct view display, the first beam expander configured to expand a beam diameter of the picture light in one of horizontal direction and vertical direction; and
a second beam expander configured to expand the beam diameter of the picture light in the other of the horizontal direction and vertical direction.

13. The display device of claim 12, further comprising a reflector between the first and second beam expanders.

14. The display device of claim 1, wherein the light source has emits a white light.

15. The display device of claim 1, wherein the light source emits red, green, and blue light.

16. The display device of claim 1, wherein the optical modulator is a liquid crystal device or a Digital Micromirror Device.

* * * * *